US009080591B2

(12) United States Patent
Van Cor

(10) Patent No.: US 9,080,591 B2
(45) Date of Patent: Jul. 14, 2015

(54) CONCENTRIC THREADED FASTENER AND FASTENER SYSTEM

(76) Inventor: Dale Van Cor, Winchester, NH (US)

( * ) Notice: Subject to any disclaimer, the term of this patent is extended or adjusted under 35 U.S.C. 154(b) by 366 days.

(21) Appl. No.: 12/804,040

(22) Filed: Jul. 12, 2010

(65) Prior Publication Data

US 2011/0008130 A1   Jan. 13, 2011

Related U.S. Application Data

(60) Provisional application No. 61/270,603, filed on Jul. 11, 2009.

(51) Int. Cl.
*F16B 35/04* (2006.01)
*F16B 33/02* (2006.01)

(52) U.S. Cl.
CPC ...................... *F16B 33/02* (2013.01)

(58) Field of Classification Search
CPC ........................................................ F16B 33/02
USPC ................. 411/381, 386, 387.6, 411, 412, 411/424–426, 433, 453, 454, 489; 81/441
See application file for complete search history.

(56) References Cited

U.S. PATENT DOCUMENTS

| | | | | | |
|---|---|---|---|---|---|
| 1,953,095 | A | * | 4/1934 | Baker | 403/307 |
| 2,066,132 | A | * | 12/1936 | Zihler | 76/101.1 |
| 2,079,692 | A | * | 5/1937 | Lapointe | 403/334 |
| 2,863,348 | A | * | 12/1958 | Conger | 81/441 |
| 3,586,353 | A | * | 6/1971 | Lorenz et al. | 285/334 |
| 3,764,278 | A | * | 10/1973 | Ivanier | 428/592 |
| 3,952,618 | A | * | 4/1976 | Seamon | 81/441 |
| 4,444,421 | A | * | 4/1984 | Ahlstone | 285/86 |
| 4,878,794 | A | * | 11/1989 | Potucek | 411/395 |
| 5,131,795 | A | * | 7/1992 | Kobusch | 411/178 |
| 5,425,407 | A | * | 6/1995 | Archuleta et al. | 152/370 |
| 5,951,560 | A | * | 9/1999 | Simon et al. | 606/304 |
| 7,152,509 | B2 | * | 12/2006 | McCalley et al. | 81/53.2 |
| 2008/0025819 | A1 | * | 1/2008 | Hormansdorfer | 411/411 |
| 2008/0273941 | A1 | * | 11/2008 | Van Cor | 411/426 |
| 2011/0025925 | A1 | * | 2/2011 | Hansen | 348/734 |

* cited by examiner

*Primary Examiner* — Gary Estremsky
(74) *Attorney, Agent, or Firm* — Michael J. Persson; Lawson Persson & Weldon-Francke, P.C.

(57) ABSTRACT

A concentric threaded fastener comprising a body with a starting shape, an ending shape, and at least one continuous surface formed by layers between the starting shape and the ending shape, where the layers are concentric so that each successive layer from the starting shape to the ending shape has local clearance between the layer and a larger adjacent layer and so that each layer forms a plug when it is aligned in an unrotated position, and where each layer is successively rotated about at least one axis to form the continuous surface. A concentric threaded system comprising a concentric threaded fastener and a receiving component comprising an opening with mating continuous surface dimensioned to accept the continuous surface of the concentric threaded fastener so that the mating continuous surface and the continuous surface of the concentric threaded fastener make complete surface contact when the concentric threaded fastener is at a terminal position within the receiving component.

19 Claims, 24 Drawing Sheets

CONCENTRIC THREADED FASTENER AND FASTENER SYSTEM

CLAIM OF PRIORITY

This application claims the benefit of priority of U.S. Provisional Application Ser. No. 61/270,603, filed on Jul. 11, 2009.

FIELD OF THE INVENTION

The present invention relates to the field of fasteners and seals, in particular, to threaded fasteners and fastener systems that may be quickly and precisely engaged.

BACKGROUND OF THE INVENTION

Threaded fasteners, such as bolts and screws, have been used in a variety of application for many years. Conventional bolts include a thread that is a continuous helical ridge formed on the outside of a cylindrical body. The topmost point on this ridge is called the crest. Between each crest is a space and the bottommost point in this space is called the root. In common bolts, threads are set at an angle to the axis of the bolt, which is called the helix angle. The angle must be sloped, either upward to the right for right-hand threaded screws or upward to the left for left-hand threaded screws. Thread pitch is the distance from the crest of one thread to another crest measured along the length of the thread. The lead distance is the width across the crests of a single or multiple threads.

Conventional threads are designated or named by the external thread major diameter and a pitch measurement. The major diameter is the outer diameter at the top of the thread crests. Thread sizes are given in nominal sizes, not in the actual measurement, and the exact measurement is slightly below the named or nominal size.

Threads are sometimes identified as "fine" or "coarse". A fine thread will have a relatively small pitch measurement, and the threads will be closer together. A coarse thread has a relatively larger pitch measurement, and the threads will be further apart. A fine thread will have less depth as compared to a coarse thread, and consequently are easier to strip. A coarse thread is more resistant to stripping but also less efficient in transmitting torque into thread tension. Generally, a fine pitch is easier to tighten in that tension is achieved at lower torques.

Conventional threaded fasteners are widely used and are generally effective. However, conventional threaded fasteners have a number of drawbacks that make them inappropriate in certain applications. For threads to interchange and match, both the diameter and pitch must match. Even when threads are properly sized, there will be play or slop between external and internal threads when engaged. This play is thought to be normal and is supposed to disappear when the fastener is tightened, allowing a thread to be a bit larger or smaller than ideal while allowing the bolt to still function adequately. However, if tolerances are exceeded, the fastener may require excessive force to install, causing the thread to fail during tightening, or may result in a sloppy fit, compromising the holding power of the fastener.

Tightened threads subjected to vibration loosen because of the clearance space. This clearance is needed to engage the threads, such as in a nut and bolt, with a reasonable amount of friction. Its drawback is that it becomes the ramp that the screw or nut will follow and loosen subject to thermal changes and/or vibration.

Further, because of the unreliable fit of conventional threaded fasteners, and their substantially constant diameter, sealing compounds or gaskets are needed when such fasteners are used in connection with packaged foods or in pressurized applications, such as plumbing, in order to ensure that fluids do not migrate through gaps in the threads and cause leaks. The use of such compounds or gaskets significantly adds to the cost of these applications. Further, even if compounds or gaskets are applied, it is not readily apparent whether such compounds or gaskets are providing an adequate seal.

Another disadvantage of conventional threaded fasteners is that it is difficult to determine their depth, which allows them to be over tightened to extend beyond their intended length. This disadvantage is of greatest detriment in the case of screws, where screw tips can extend beyond the backside of the material to be joined, but is likewise an issue with conventional bolts.

Still another disadvantage of conventional threaded fasteners is the need to properly center the fastener within the hole. Improper centering can result in stripping of the threads and, therefore, care must be taken to ensure that the threads are properly centered to mate with the opening.

Finally, because conventional threaded fasteners require a large number of threads to be engaged in order to provide adequate holding power, and because these threads are of a substantially fixed major diameter, conventional threads must be rotated a large number of times in order to adequately secure them. Accordingly, high-speed assembly of conventional threaded fasteners requires the use of an automated screw gun, or variable speed drill equipped with a driver bit. These devices are cumbersome, expensive, and pose a high risk of stripping the head of the bolt or screw.

Machinery and other complex assemblies often require a number of nuts and bolts of various sizes and strengths.

In response to these problems, the inventor of the present invention developed the conic threaded fastener disclosed in co-pending patent application Ser. No. 11/178,890 filed on Jul. 11, 2005, and the wave threaded fastener in co-pending patent application Ser. No. 12/148,047 filed on Mar. 3, 2008, each of which are incorporated herein by reference. However, it has been found that the conic and wave threaded fastener presents certain manufacturing challenges that have heretofore prevented it from gaining widespread acceptance. Accordingly, there is a need for a fastening system that has the advantages of the conic and wave threaded fastener, but is substantially easier to manufacture. It is also recognized that reducing the total number of fasteners would be advantageous.

Therefore, there is a need for a threaded fastener that produces a tight seal without the use of gaskets or sealants, does not have a clearance space, that is of fixed length and cannot extend beyond its intended design length, that may be tightened, either automatically or by hand, more quickly and easily than conventional fasteners, that is self-centering and therefore fast to setup, that eliminates the need for a screw gun, that distributes pressure on the threads over a larger surface area of the teeth than a cylinder shape, that may be quickly tightened, and that is substantially easy to manufacture and have the potential of being built into the parts.

SUMMARY OF THE INVENTION

The concentric thread is a type of fastener that rotates or screws together an external concentric thread with a mating internal thread such that all the surfaces engage creating a seal and a very strong hold. The conic thread and the wave thread have the same surface engaging feature.

Concentric objects share the same center, axis or origin with one inside the other. The design of a concentric thread starts with a shape such as square, star, circle or a wide range of geometric and non-geometric shapes. These shapes can be duplicated at smaller sizes inside the original or at larger sizes outside the original. They can also morph, for example by gradually changing from a square to a four pointed star. They are still concentric to the original shape.

Portrayed as two-dimensional with shapes inside shapes highlights the primary design restriction: local clearance. The edge of each shape cannot interfere with another.

Expanding these shapes three-dimensionally requires that the continuous surface of the changing shapes be expressed in vertically spaced layers. These shapes become cross-sections of the solid at intervals. The interval spacing can be constant or constantly changing. Non-constant spacing will interfere with the act of fastening the internal and external surfaces—they will not screw together.

Spacing the layers out forms a concentric plug. It will look like a wire frame image because the layers are representing a continuous surface. Simple shapes will look flat when viewed looking down through the plug and local clearance can be seen. The importance of the plug is to see that the shapes do not interfere with one another.

For the concentric plug to be a concentric thread there has to be rotation. Each layer has to be rotated to form a concentric thread. A square concentric plug with each layer rotated a fixed degree on its center axis will look similar to a standard thread.

The degree of rotation can be constant or constantly changing.

The concentric thread is not limited to a center rotation. The rotation can be offset horizontally from its center. The radius of the offset can be constant or constantly changing. The horizontal offset can be viewed as two-dimensional looking down from the top. Three-dimensional offset would have a vertical component so the plug could have a curve shape like a horn. Each layer would have a cumulative tilt. Though the offsets are described as vertical and horizontal, that is just a means to describe an offset radius that can originate at any point, and there can be more then one acting on a layer. Local clearance is the rule, if it fits, it works.

A circle shape has a special property. Rotating it does not form a thread. It has to have an offset rotation and it will form a single lead axial wave thread. The first wave thread was a stack of cardboard circles each getting progressively larger, with their centers offset ½ inch. Each layer progresses around the offset circle a set number of degrees resulting in an exterior wave thread shape.

A concentric thread has a shape with concentric layers that become progressively larger (or smaller) and rotate around one or more offset axes.

The origin of the concentric thread was in recognizing that an axial wave thread with other shapes made a different thread with different properties. A stack of expanding square shapes did not need to have an offset circle like the wave thread, it could rotate on its center and produce a unique thread. It could also have an offset center of rotation, or multiple ones.

The shape of a concentric thread can be designed to hold laterally. Jigsaw puzzle pieces are known to lock together laterally. A shape like a four leaf clover can have separate parts with external leaf shapes held together by a complete four leaf shape. Designed as a concentric thread, it is called a Persson Lock. It is a multi-axis fastener meaning that is fastened downwards like a standard screw and fastens laterally so as to join multiple parts together or reinforce their attachment.

Multiple concentric threaded components can be designed to act in concert. An example of two concentric spikes, curved and expanding like a bull's horn can be used to fasten multiple surface together. A single spike would have stress on its shape to deform or round out, while two or more would prevent such rotational deformation. This is called a Lawson Lock.

Standard male and female threads can move relative to their clearance space until they are compressed. They are typically compressed against 32-35% of their surface to a maximum amount of force. Beyond this maximum is the shear force which will strip the threads. The concentric threads are not cylindrical and the total surface engages. Thus load and shearing forces are better distributed and therefore higher.

Standard threads are uniform and over 50% of the shearing force is on the first rotation thread. The concentric threads can be designed with a shorter, stronger profile that expands to full size over its course. This makes the beginning more resistant to load and shear force, and distributes them over the total thread.

Standard threads require a clearance space which is necessary to add or remove a nut. This clearance space is the means by which the male and female threads can act separately. It provides a ramp up which the standard threads can slide. The sliding is a relief of stress in a reaction to vibration or heating and cooling cycles. The concentric threads do not have any clearance space so they transmit head and vibration as a unit.

The principal shared feature about the concentric thread, wave thread and conic thread that separates them from standard threads is that they are designed to have total surface contact. A circular wedge is one way to understand their dynamics. These threads rotate into a terminal position where their total surfaces are wedged together. They are loose until that terminal position. This results in wedged parts that act as a single unit absorbing and transmitting energy, such as heat and vibrations. They are inherently resistant to loosening.

Threads are usually thought of in very specific integral parts. The concentric thread has far reaching charateristics. Portions of a concentric thread can be imbedded into parts whose assembly becomes structurally dynamic. The head on a gas lawn mower, for example, may be given a 30-degree rotation to lock onto the engine block, then one or two bolts may hold it in that position where normally a dozen bolts would hold the head to the block. This greatly simplifies assembly and reduces the number of parts necessary for assembly. In addition, having an assembly with fewer different parts making recycling easier.

The concentric threads can also be used as a carrier to a net application. The threads will fasten two components together and a high voltage current welds the threaded surfaces together, forming a rivet. This may be used for electrical connections. The male and female threads can have a chemically reactive coating that glues the surfaces together for a permanent hold.

To permanently attach unlike materials such as copper or aluminum, high voltage applied under pressure can be used to mix the atoms into a microscopic lattice. Currently this is done with copper and aluminum rods attached to high voltage electrical conductors. The rods can be replaced with threaded components so that the lattice will form on both threads.

An inherent characteristic of the concentric thread is that it is position specific, especially with a single lead, with a specific termination point. Multiple identical leads will have the same number of termination points. This can be applied to a special directional tooling that will fit into a concentric shape bolt and, once fastened, will drive the bolt. Multiple threads with one lead different from the others guarantee that there is only one way to engage the threads.

This position specificity allows inherent orientation of conduits through the fastener. These conduits can be electrical, electronic, gas, fluid, plasma, optical, or inferred. Anything that moves through a conduit can be controlled and directed by a fastener designed for specific conduit orientation. This thread allows for greater safety. An electrical connection, for example, may require a connection across the thread before it connects through the thread. The circuit through the fastener will not be made until all the surfaces engage. This would apply to laser and inferred conduits as well.

In other conduit applications where the total engagement of the fastener orients a connection port, different devices with the same threads would control different port assignments. This type of engagement is inherently a valve.

The threaded system can be a combination valve and pump with a rotating member acting as the pump in a relatively stationary position and acting as the valve when relative lateral motion causes the surfaces to fully engage.

The concentric threads differ from the conic and wave threads in several ways. The rotation of conic and wave threads is preferably perpendicular to a two-dimensional plane. The concentric thread can be in a three-dimensional rotation such as a threaded horn or curl shape, which also produces greater surface area. Increasing the offset rotation with or without a center of rotation also results in greater surface area.

The lateral shape of the concentric thread can be structurally dynamic. An example is the Persson Lock that can have a two-dimensional hour glass shape which will structurally hold its mating form. This shape converted into a three-dimensional concentric thread will allow lateral fastening and the vertical fastening the parts. This lateral shape can be in multiple parts with vertically and horizontally curved shapes that hold multiple parts laterally.

An effect of these different shapes is that the vertical and horizontal curves distribute load and shear force across different planes. Shear force is directed perpendicular to a plane. Normal threads experience their downward shear force cyclindrically because the teeth are on a cylindrical shape. The non-cylindrical concentric threads redirect the direction of the shearing force.

Multiple threaded parts will act as a single unit fastening to other parts. They will also distribute load and shear force across different planes while fastening multiple parts.

Because of the infinite variety of geometric shapes, a customer can create fasteners unique to their products. The term "key" is used to identify a locking mechanism unique to the lock. Concentric threads can have a large range of variables such that a unique fastener can apply to a specific part. That exact fitting part will be required to fit and fasten other components together. The effect is to make controlling access to the keys more difficult though not impossible. An example is a concentric threaded engine bolt, which the manufacturer could control such that it could not be purchased unless the purchaser was qualified, for example, as a mechanic or dealer.

The conic, wave and concentric threads can be used in structural assemblies. Steel beams can have a partial thread that will lock it into place with a quarter turn. The mating H-beam would have the female form rolled into its H-shape so the only thing needed would be one or two bolts to keep it from unscrewing. This is using the circular wedge properties of the threads.

The precision positioning of the threads could be imbedded with photo-optic connectors. Quick attachments would be screwing and unscrewing. It could also align hundreds of electronic connections, such as by adding a thread to a CPU chip.

The concentric threads are similar to the wave and conic threads in that they have male and female components rotated into a fixed terminal position. This full engagement of male and female surfaces cannot be tightened with more torsion. There is an upper limit to the amount of torsion applied. More torsion will be absorbed by the combined unit and can be transmitted through the union.

At the terminal position, there is "complete surface contact" between the male and female components. It is understood that the surface finishes of the mating components will create some gaps between the surfaces of the components and that the it would be extremely costly to finish the components so as to obtain absolute complete surface contact. However, as referred to herein, the term "complete surface contact" is intended to mean surface contact that eliminates substantially all clearance space for the parts to move separately. This is sufficient to create a water tight seal between components at up to 60 PSI pressure without the use of gaskets or other sealing materials. This complete surface contact, in addition to inherently creating a seal, becomes very resistant to sliding thus making a strongest structural hold. Breaking this structural hold requires overcoming the coefficient of friction between the mating materials. The complete surface contact will also will transmit heat and vibration as a unit.

The shape of the threads allows it to carry more load and resist shearing force than standard threads. Increasing the amount of rotation relative to the height increases the total surface area. The area can also be increased with other offset rotations. The net effect is to increase the strength of the fastener.

The threads have a wider range of variables then standard threads. This allows more customized fasteners so a manufacturer will have more control over the quality of maintenance of their products in the field.

Similarities Between the Concentric Thread and the Wave and Conic Thread

The concentric threads are similar to the wave and conic threads in a number of ways. They are each designed with a fixed terminal position and the male and female parts are rotated into this terminal position. The terminal position has the rotational limit where substantially complete surface contact is achieved. The complete surface contact at the terminal position creates a torsional limit whereby more torsion cannot wedge the parts together more. After complete surface contact, more torsion is absorbed as a combined unit and will result in breakage of the parts relative to their material shear strength.

The substantially complete surface contact at the terminal position inherently creates a seal and maximizes the resistance to sliding, which makes the strongest structural hold possible. This is a function of the coefficient of friction between the surfaces of the two mating materials that are resisting sliding. The complete surface contact will transmit heat as a unit as efficiently as tightly held surfaces can and will transmit vibration as a unit.

The shapes of each of the types of threads is more resistant to shearing then standard threads of the same materials. The shape of the threads is more resistance to loosening then standard threads and the surface area of the thread design can be increased by increasing the rotation of the layers. The surface area of the thread design can be increased by increasing the offset rotation.

Each of the threads can create unique custom fasteners. The threads can create unique keys for heads of customer fasteners and their corresponding drive tools. The threads can create unique keys for engaging electrical, electronic or photonic pathways with precision positioning of surface connections. The threads can create multiple keys for the same electrical, electronic or photonic positions for different routing. The threads can create unique keys for engaging fluid or gas pathways with precision positioning of conduits.

The threads can create unique keys for the same fluid or gas pathways positions for different routing. The threaded systems can be valves and/or a combination valve and pump with a rotating member acting as a pump in a relatively stationary position and acting as a valve when relative lateral motion causes the surfaces to fully engage. The dynamics of the threads can be designed to make multiple electrical contacts and/or photonic paths with the threads' inherent precision surface positioning.

Each of the threads may be permanently attached to their mating parts. This may be accomplished by welding them together. An application may be a nut and bolt on a bridge. A short current through their threads would melt them together. The threads may also be attached by gluing them together, as a thin coating would bond the threads. The threads may also be permanently attached by making the thread and mating part of materials that chemically interact to fasten together. To permanently attach the threads, a high voltage under pressure applied to unlike materials can mix the atoms in a microscopic lattice. Currently this may be performed with copper and aluminum rods and attached electrical conductors.

Finally, portions of each of the threads can be applied to parts such that they are positioned for quick connections.

Differences Between the Concentric Threads and the Wave and Conic Thread

The concentric thread differs from the conic and wave thread in a number of ways. The direction of rotation of the concentric thread does not have to be perpendicular to a two-dimensional plane. Rather, it can be a three-dimensional rotation such as having a threaded horn shape that rotates and curls. This is very unique.

The surface area of the concentric thread design can be increased by increasing the offset rotation with or without the center rotation.

The lateral shape of the concentric thread can be structurally dynamic. An example is the Persson Lock, which can have a two-dimensional hour glass shape that will structurally hold its mating form. This shape converted into a three-dimensional concentric thread will allow lateral fastening and the vertical fastening the parts. This lateral shape can be in multiple parts with vertically and horizontally curved shapes that hold multiple parts laterally.

Concentric threads having a vertical and horizontal curved shape that can distribute shear force across different planes. Shear force is directed perpendicular to a plane, unlike normal threads that experience their downward shear force cylindrically because the teeth are on a cylindrical shape. The concentric threads are not cylindrical and redirect the direction of the shearing force.

Finally, multiple threaded parts can act as a unit to fasten multiple parts and multiple threaded parts can act as a unit to distribute shear force across different planes while fastening multiple parts.

These aspects of the invention are not meant to be exclusive and other features, aspects, and advantages of the present invention will be readily apparent to those of ordinary skill in the art when read in conjunction with the following description, and accompanying drawings.

DETAILED DESCRIPTION OF THE DRAWINGS

Figure 1:
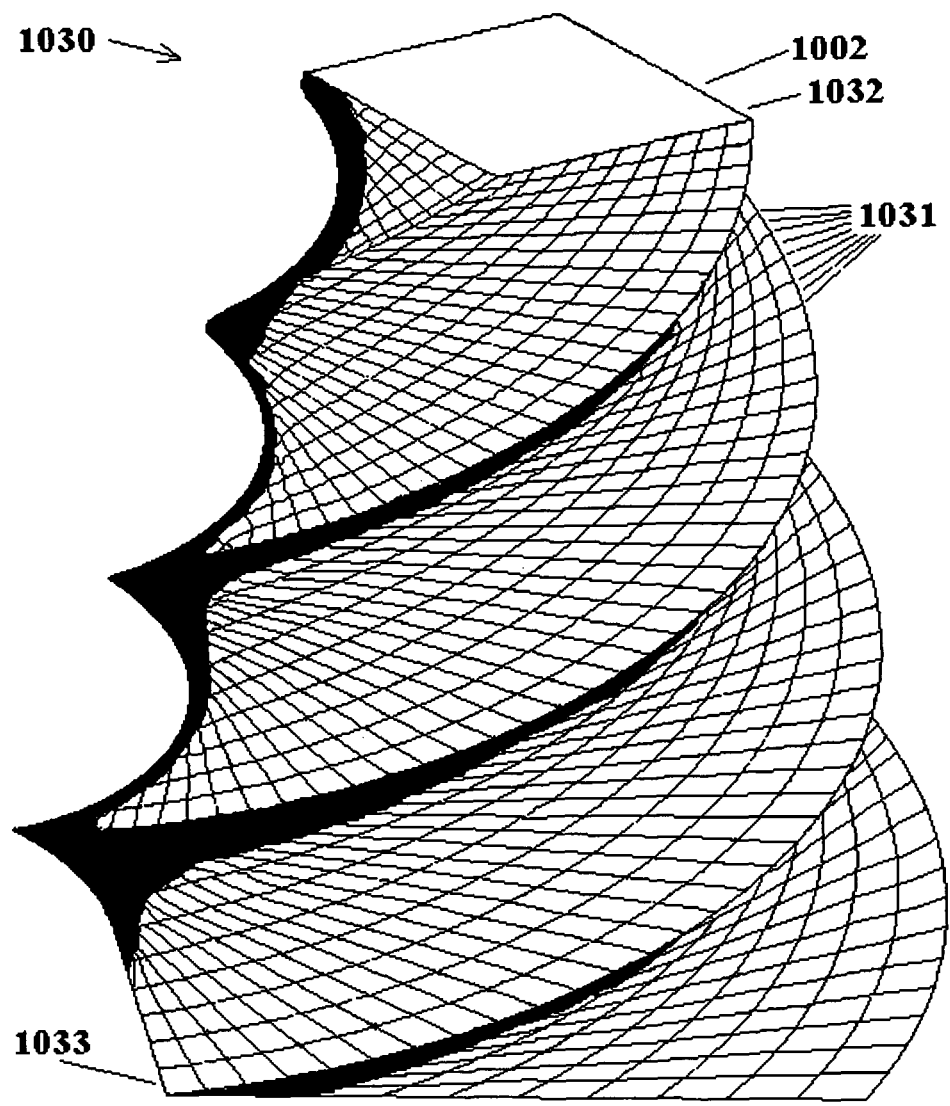
FIG. 1 shows an example of a concentric thread with a square starting shape in which each layer expands at a constant rate and rotates at a constant rate.

FIG. 1 is a wire frame example of a concentric threaded object 1030. It has a starting shape 1002 with each layer 1031 rotated 2.5 degrees forming threads. Each layer 1031 is defined by slices taken perpendicular to the central longitudinal axis with each slice having a shape that fits inside the previous shape thus each is substantially concentric from the start 1032 to the ending shape 1033. The rotation of the slices making up the thickness of the layer produces the thread. The layers actually do not exist as such. Rather, they represent cross-sections of a continuous shape and are used to describe the properties of the object.

Figure 2:
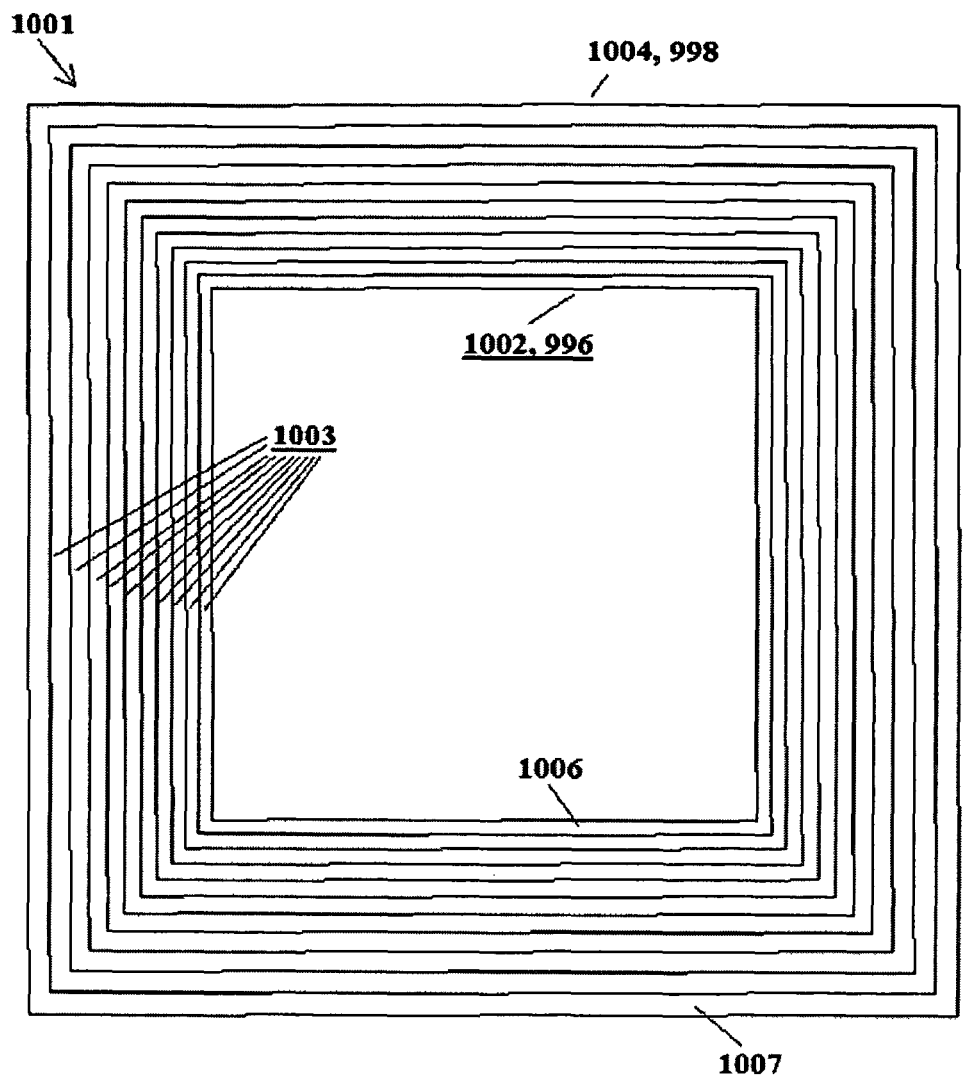
FIG. 2 shows an inside starting square with each additional square concentric to that starting square and in which each layer is square and is expanding at an accelerating rate.

The concentric thread has three characteristics, a starting shape and an ending shape, a plug formed from a plurality of layers having successively smaller shapes disposed between the starting shape and the ending shape, and a rotation of the slices' shapes which define the layers forms at least one substantially continuous surface. FIG. 2 is an example of the starting shape 1001 and the concept of concentricity. It has a slice with the starting square shape 1002 with additional slices having concentric shapes 1003 inside that end at ending shape 1004. An important property to note is that each shape fits inside the successive one without interference. This is called local clearance and is the cornerstone in the principal of concentric threads.

Example 1001 started with an outside shape 1004 and progressed inwards ending at 1002. It could have started on the inside shape 1002 and ended on the outside 1004. What is relevant is the concentricity of the shapes. Note that the starting space 1006 expands to the ending space 1007 because the shapes are expanding at a constant rate.

Figure 3:
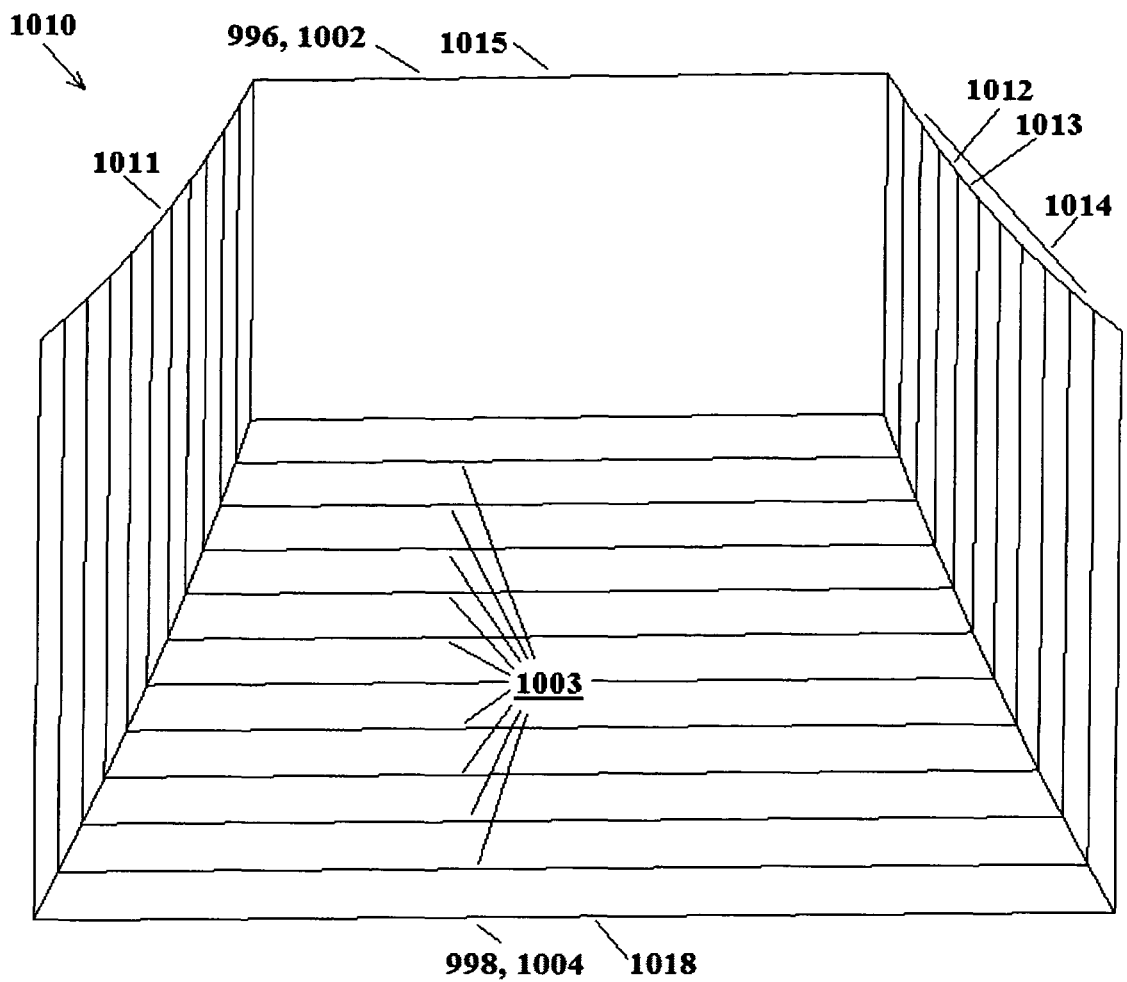
FIG. 3 shows a diagrammatic view of the concentric squares in FIG. 2 expanded into a plug, which has curved sides because the layers in FIG. 2 were expanded in size.

The plug characteristic is demonstrated as a wire frame in FIG. 3. This converts the flat concentric shapes 1001 in FIG. 2 into a three-dimensional plug 1010. It has the starting size 996 of starting shape 1002 at the top position 1015 and the ending size 998 of ending shape 1004 at the bottom position 1018. In all cases, a starting shape, such as starting shape 1002, will be a fraction of the size of an ending shape, such as ending shape 1004. This may fraction be proper, such that the starting shape is smaller in size than the ending shape. This fraction may be improper, such that the starting shape is larger in size than the ending shape. This fraction may be at unity, such that the starting shape and the ending shape are of the same size. It is understood that "starting" and "ending" shapes are arbitrary designations. The expanded shape 1010 still has to maintain the local clearance. Maintaining local clearance is not an apparent issue with this simple shape, but it may be with more complex shapes.

The shape of the plug may be controlled in two ways. First, the shape may be affected by accelerating or decelerating the rate of expansion of the thickness of the layers. Second, the shape may be affected by accelerating or decelerating the rate of expansion of the size of the concentric shapes. In addition, both of these ways may be simultaneously incorporated, in which case the effects may be magnified, or the effects of one may reverse or cancel out the effects of another. This concept is shown in FIG. 3.

In FIG. 3, layers 1003 get slightly thicker between the top position 1015 and the bottom position 1018. (The change in thickness is more easily observed in FIG. 2, as it is observable that starting space 1006 is thinner than ending space 1007.) The rate of this change in thickness is constant, however. In other words, there is no acceleration or deceleration of the rate of expansion of the thickness of the layers 1003. Therefore, if this were the only factor in determining shape, sides 1013 would be straight 1014. However, the starting size 996 at the top position 1015 is smaller than the ending size 998 at the bottom position 1018, and the rate of increase in size is accelerating, giving the plug 1010 a convex shape 1011. If the rate of change of size were constant, just as with constant rate of change of layer thickness, the sides 1013 would be straight 1014. If the plug 1010 were increasing in size at a decreasing rate, plug 1010 would have a concave shape (not shown).

In summary, in FIG. 3, we see the two factors that control the shape of plug 1010 working together, or in this case, against one another. The layers 1003 getting thicker at a constant rate would make for sides 1013 with a straight 1014 profile. The increase in size between sizes 996, 998 accelerating would make the sides 1013 having a greater curve profile than that we observe in FIG. 3. The two factors combined result in the slight curve 1012 profile we observe in FIG. 3. In essence, the straight 1014 profile contributed by the constant rate of change of layers 1003 lessens the magnitude of the curve profile contributed by the accelerating rate of change of sizes 996, 998, making for a combined slight curve 1013 profile. It is important to remember that these concentric layers are slices used to explain a continuous shape. Thus the overall continuous shape of the concentric thread profile may have concave, convex, or straight sides.

Figure 4:
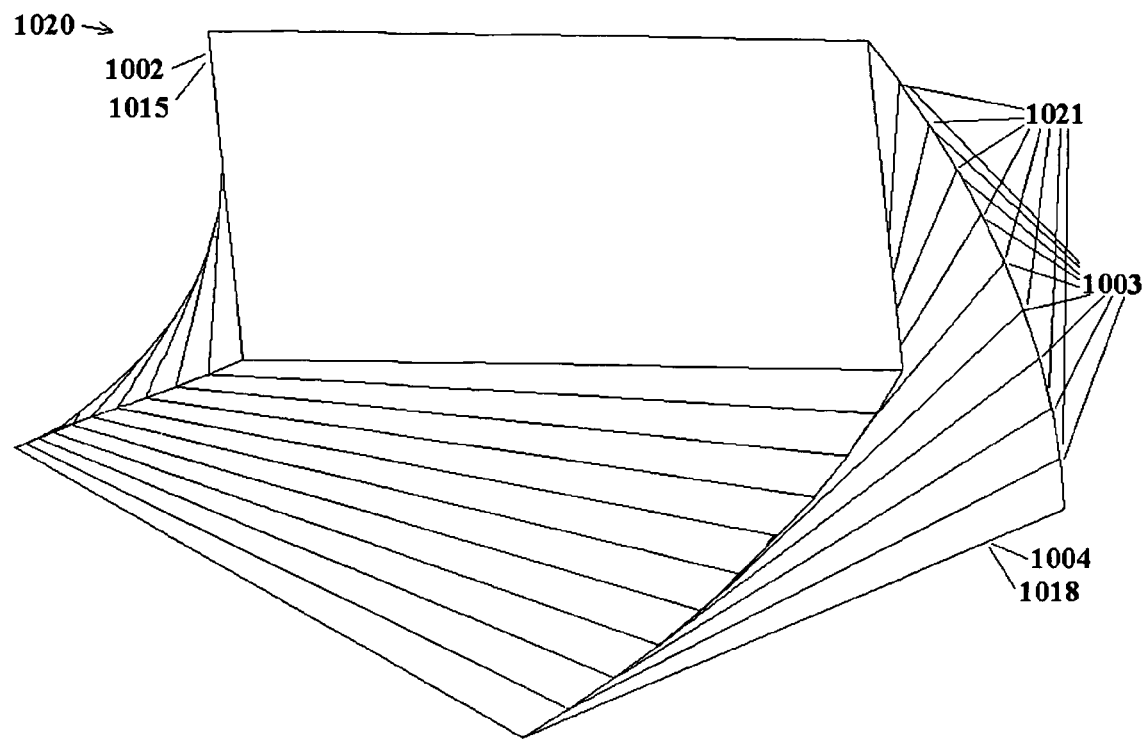
FIG. 4 shows FIG. 3 with the layers rotated.

The last characteristic is the rotation of the concentric shapes. It is this rotation that turns the plug into a thread 1020. FIG. 4 shows the plug 1010 started in FIG. 3 with each concentric layer 1003 rotated 5 degrees accummulatively. It started with the first shape 1002 at position 1015 and each layer 1003 progressively rotated to their new positions 1021 to the last layer 1004 at position 1018.

FIG. 1 is the culmination of the FIGS. 2-4. It is a top angle view of a large concentric thread 1030 with the same staring top 1002 as FIGS. 2-4. This wire frame diagram has each layer 1031 rotated 2.5 degrees. This shape has been shown as a square expanding with the slices defining each layer being shaped as a square. In FIG. 3 the rate of change was demonstrated as producing a convex shape to the plug. The plug can start as one shape and morph into something different.

Even though the concentric threads are expressed in layers, they are actually continuous. The layers demonstrate how the thread rotates and how it increases the size of its shape as shown in the wire frame model of FIG. 1.

Figure 5A:
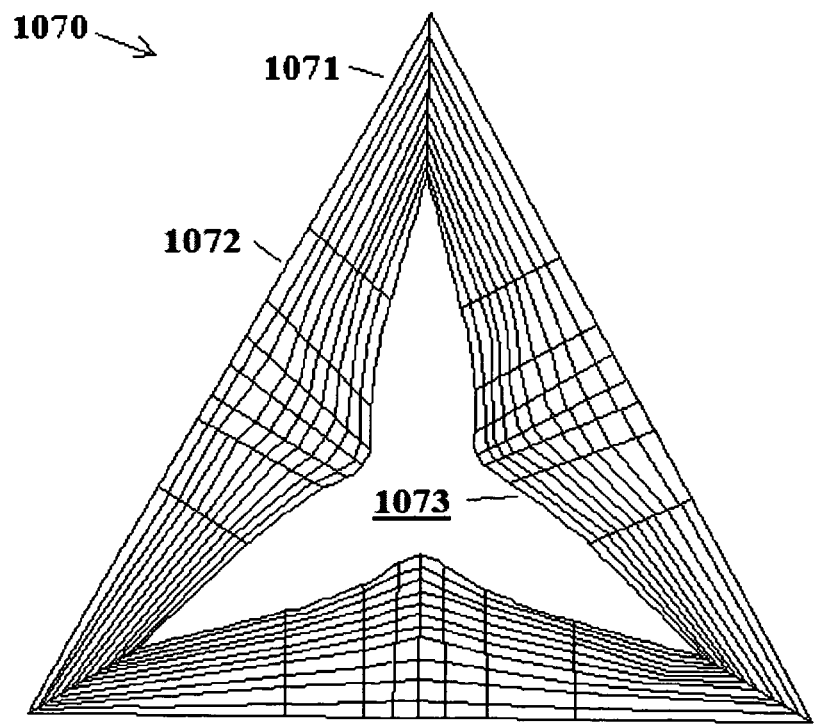
FIG. 5A shows a top view of a triangle that morphs into a three pointed star, which starts with an outer triangle and the concentric shapes are formed inwards causing a migration in each shape to morph into the three pointed star.

A concentric thread can morph form one shape such as a triangle to a three pointed star as shown in FIGS. 5A-5D. FIG. 5A is a the top view of the plug 1071 for of an external threaded part 1070 that starts with a three pointed star 1073 and ends with a triangle 1072.

Figure 5B:
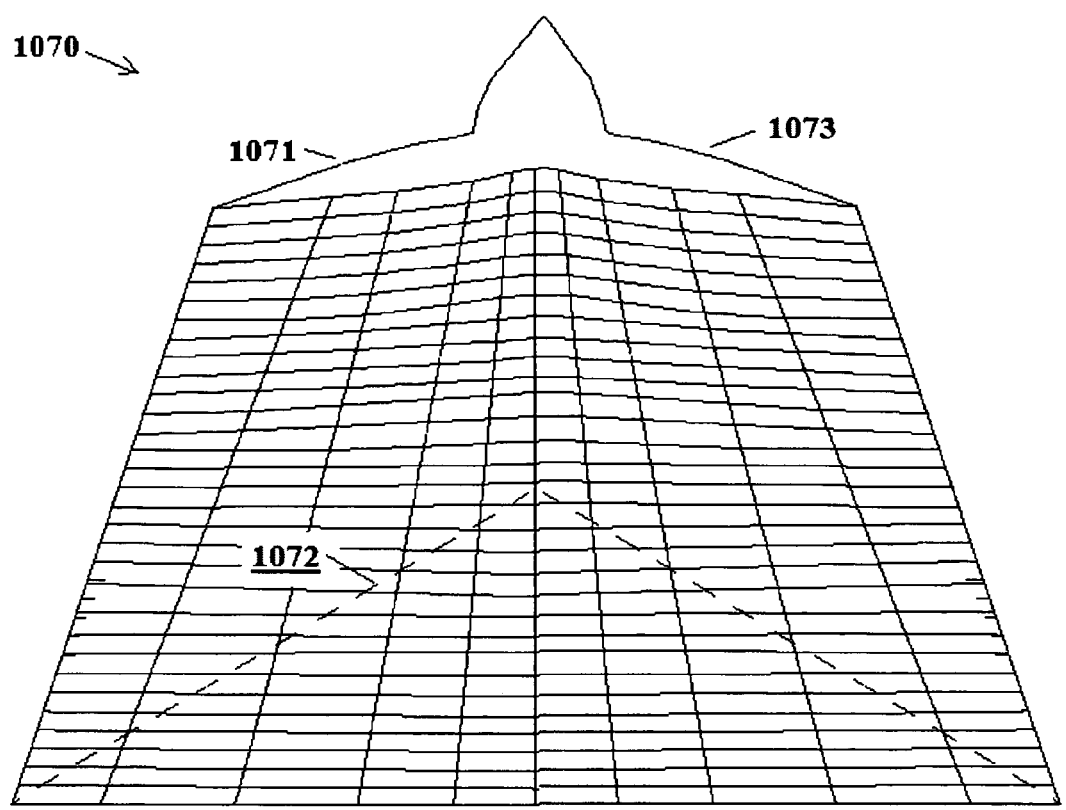
FIG. 5B shows a side view of the shapes of FIG. 5A extended into a three-dimensional plug in which the three pointed star is on top and the hidden triangle is on the bottom.
Figure 5C:
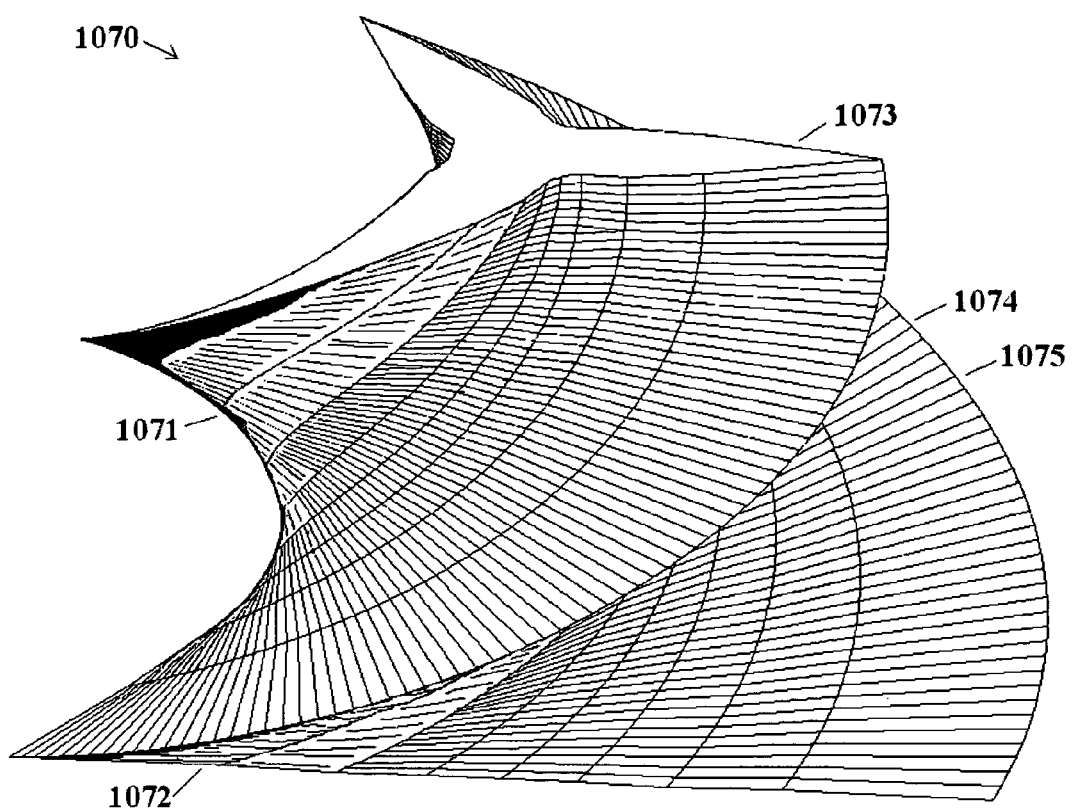
FIG. 5C shows each layer from FIG. 5B rotated to form a concentric thread in which the accumulative rotation results in thread with half a turn.
Figure 5D:
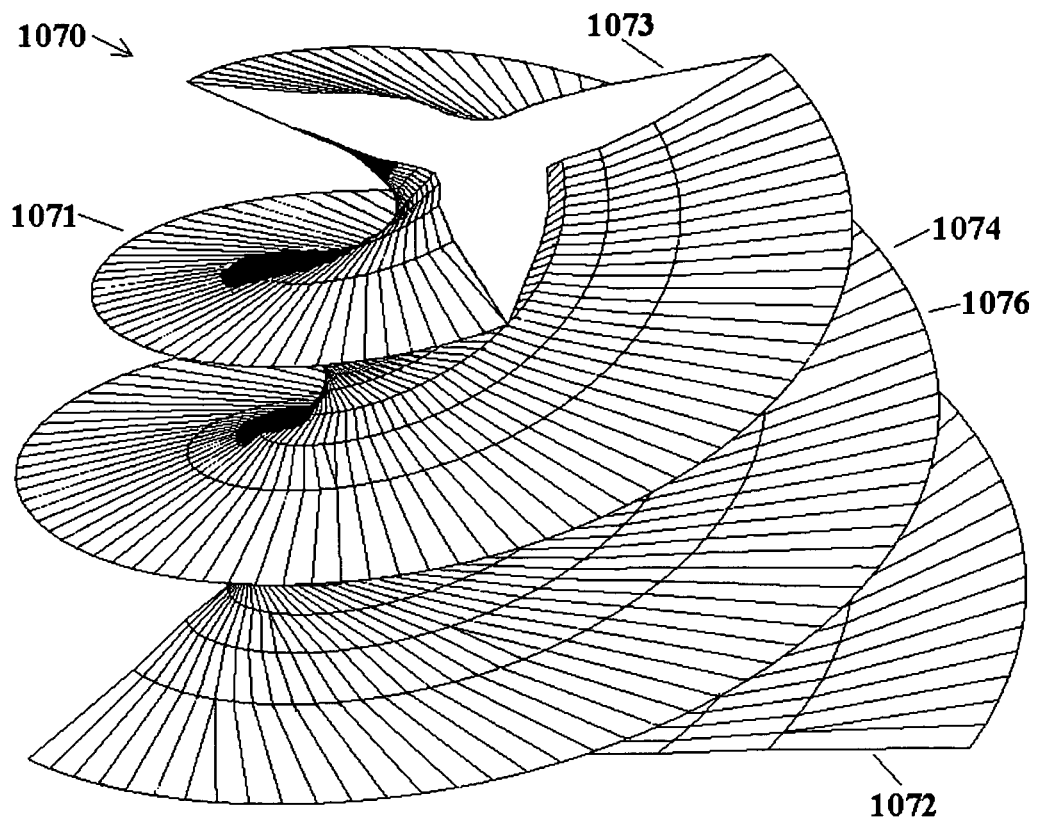
FIG. 5D shows each layer rotated three times as much as in FIG. 5C, resulting in a thread with one and a half turns, and in which expanding the length of the thread expands the total surface area.

FIG. 5B shows the plug 1071 in which the three pointed star 1073 at the top gradually morphs into the triangle 1072 at the bottom. FIG. 5C is a side view of the plug 1071 rotated 2 degrees per layer 1075 shown as a wire frame surface 1074 that is thread-like. FIG. 5D is the same plug 1071 rotated 4 degrees per wire frame layer 1076 showing a longer thread 1074.

Figure 6A:
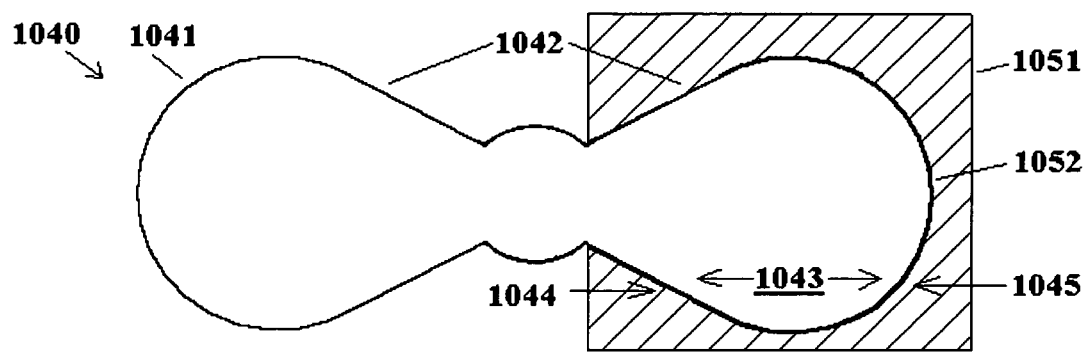
FIG. 6A shows a two lobe shape with one half inside a box.
Figure 6B:
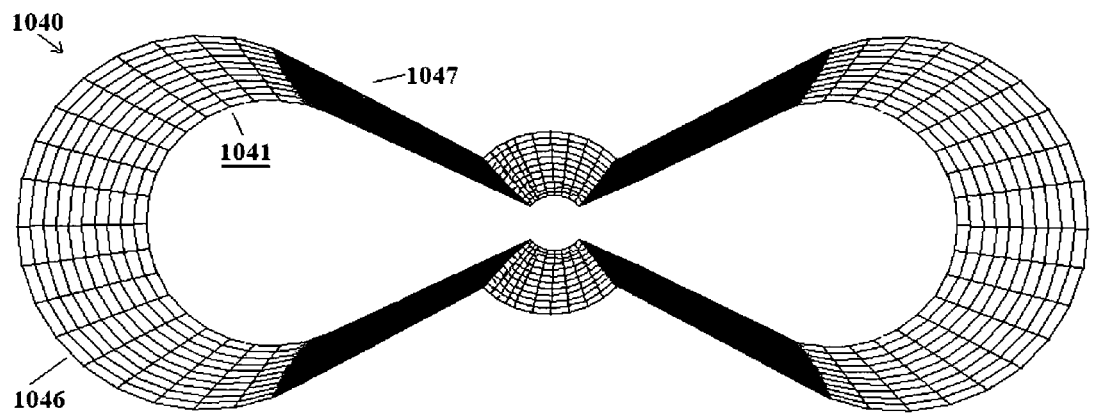
FIG. 6B shows the two lobe shape of FIG. 6A with concentric shapes inside it.
Figure 6C:
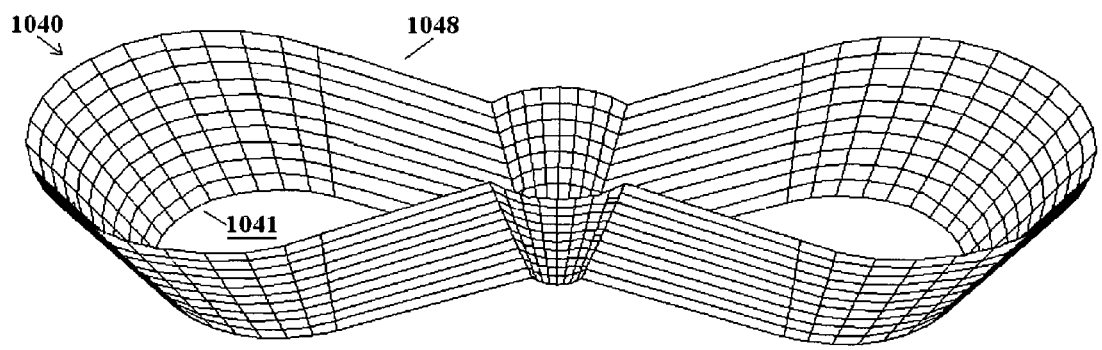
FIG. 6C shows a top isometric view of a wireframe of the plug formed from FIG. 6B.

FIGS. 6A-6C show another concentric thread system 1040 that is geometrically designed to resist lateral forces. The barbell shape 1041 with a narrowed central portion and a pair of bulbous ends 1042 in FIG. 6A is shown locked inside a box 1051 with a corresponding shape 1052. It can not be pulled laterally 1043 because the box 1051 will resist these lateral forces 1044, 1045 due to its geometry.

Figure 6D:
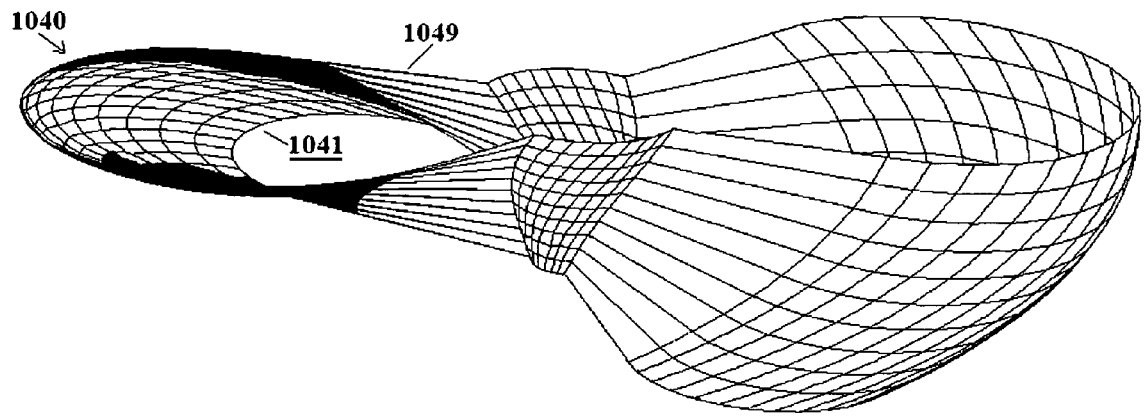
FIG. 6D shows FIG. 6C with a small rotation forming a weak concentric thread.

There can be many jigsaw-like shapes that have lateral locking charateristics. This shape 1041 is expanded into a concentric shape 1047 in FIG. 6B to a starting shape 1046. FIG. 6C is the third-dimensional expansion into a concentric plug 1048. FIG. 6D has each layer rotating 3.5 degrees per layer to produce the concentric thread 1049.

Figure 7A:
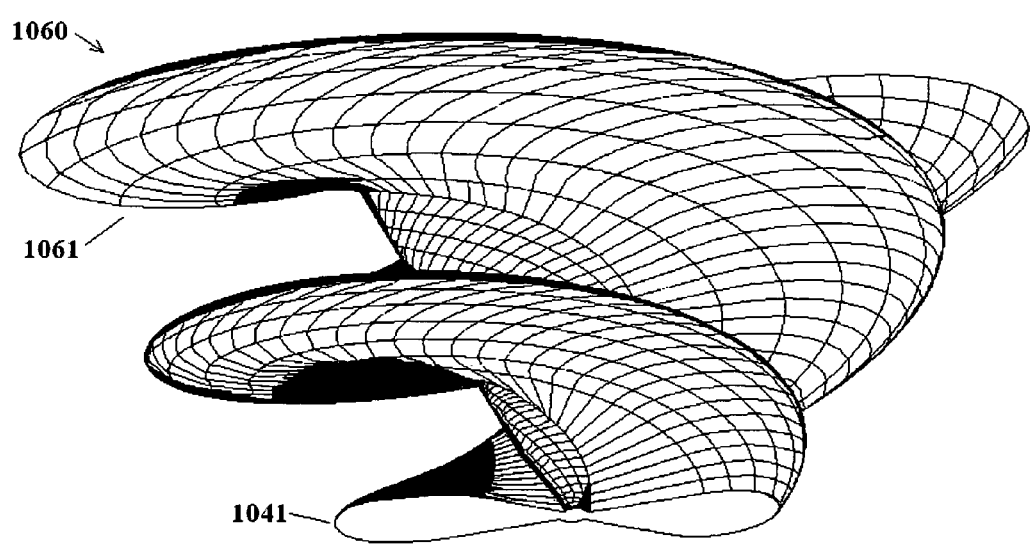
FIG. 7A shows the two lobe shape of FIG. 6D with many more layers added to be a longer external concentric thread.
Figure 7B:
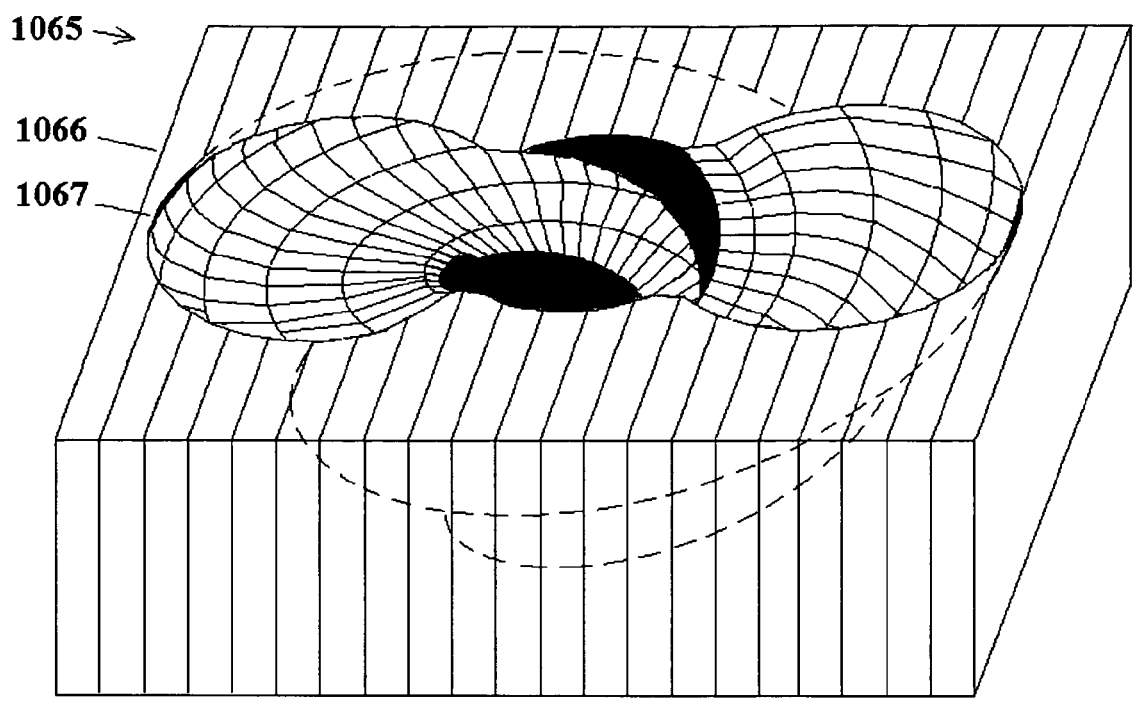
FIG. 7B shows the receiving internal concentric thread for the external concentric thread of FIG. 7A.
Figure 7C:
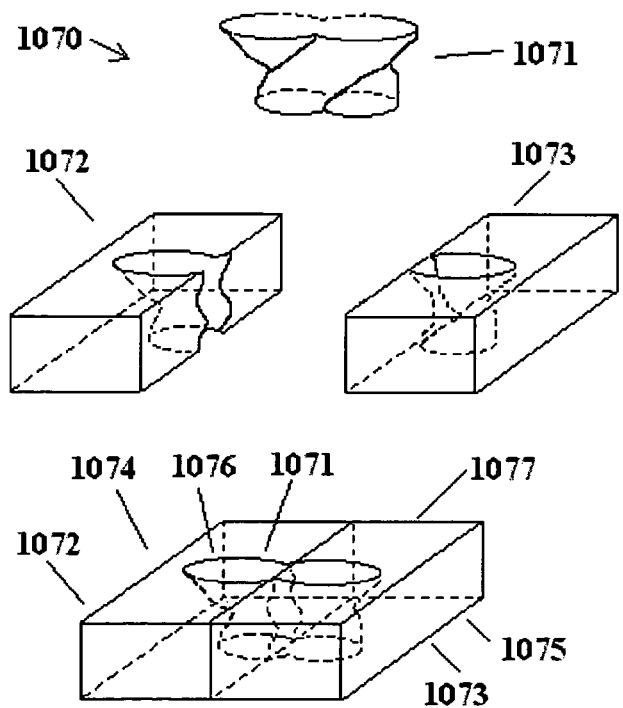
FIG. 7C shows an exploded view of a Persson lock with two female components that are locked together with one male component.
Figure 7D:
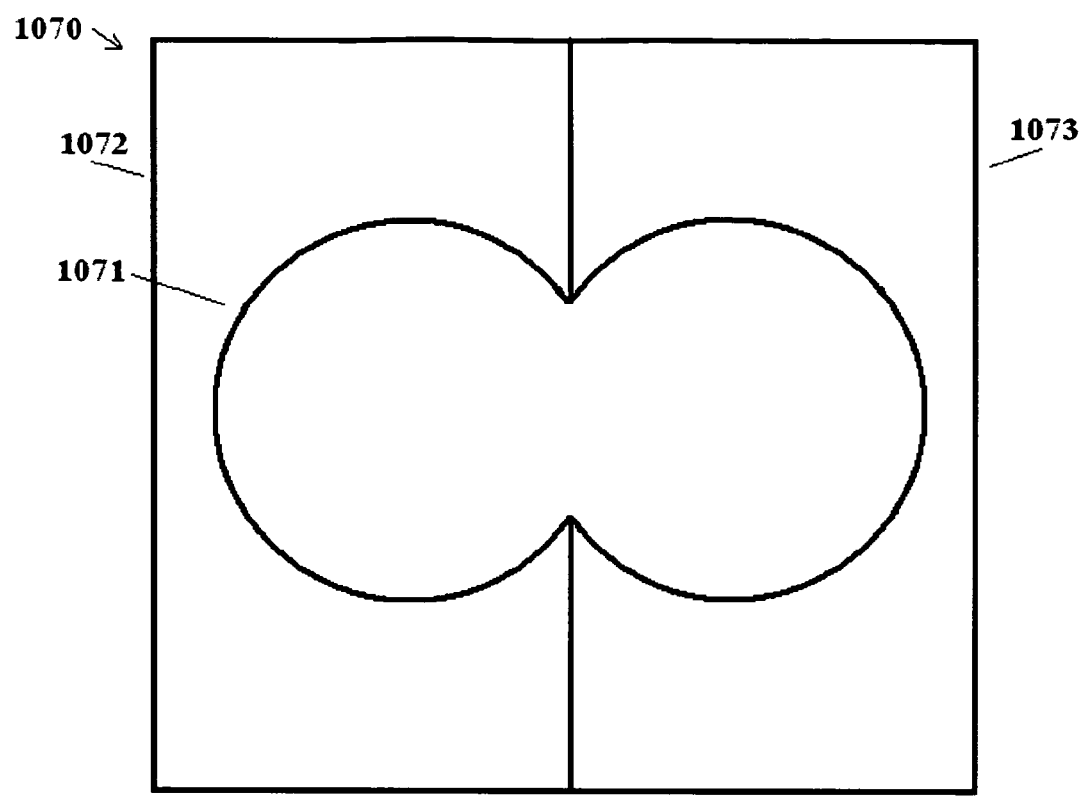
FIG. 7D shows a top view of the shape used in FIG. 7C showing the two lobe shape providing lateral fastening.

FIG. 7A shows a concentric threaded fastener 1060 with the bottom up. The concentric thread 1061 has the same starting shape 1041, as in FIGS. 6A-6C. FIG. 7B shows a receiving component 1065 that has a part 1066 with a female thread 1067. The type of thread system in FIGS. 6 and 7 is called a Persson Lock. Although the shape of the Persson Lock shown in FIGS. 6 and 7 is a preferred shape of a barbell with a narrowed central portion with a pair of bulbous ends extending therefrom, it is understood that a Persson Lock may take many shapes. The Persson Lock will screw down to hold vertically, but also pull in laterally to hold horizontally. FIG. 7C shows a simplified diagram of a concentric threaded system 1070. There are male threads part 1071 and two halfs 1072, 1073 of the female part. When the female parts are moved to adjacent position 1074, 1075 and the male part is screwed in at position 1076, the result is three parts fastened together 1077. FIG. 7D shows the lateral horizontal hold of concentric threaded system 1070.

Figure 8A:
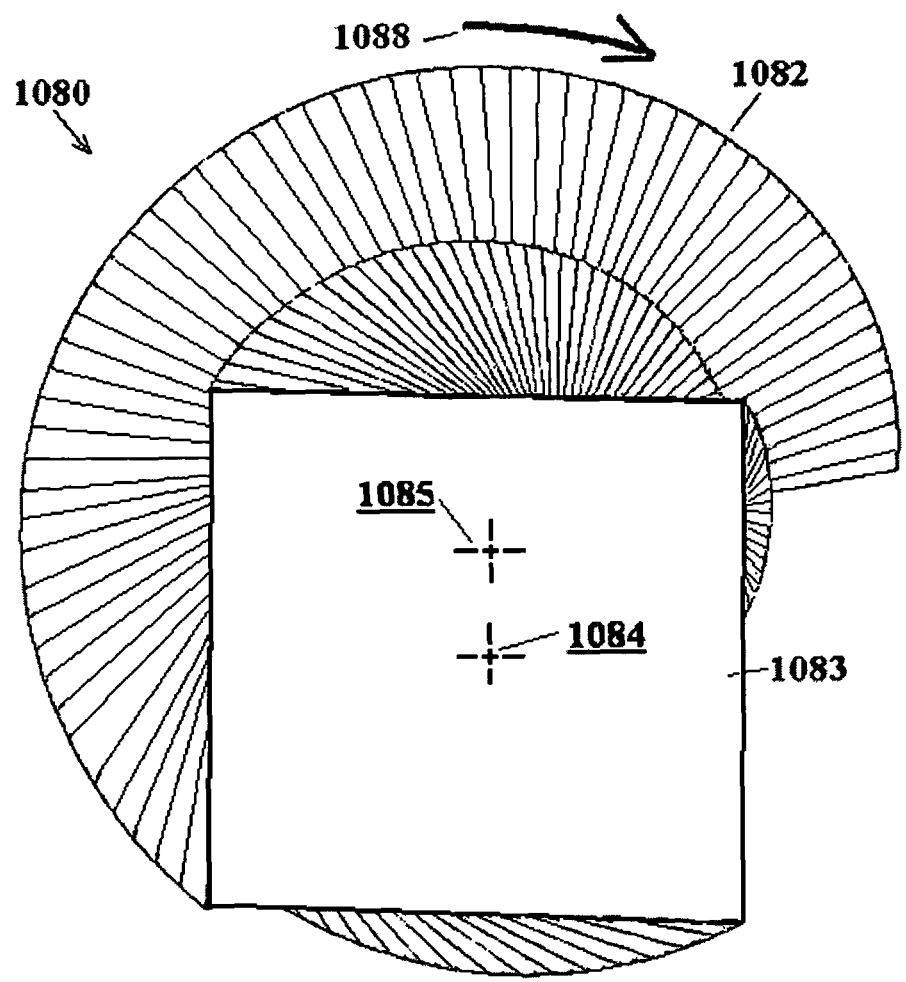
FIG. 8A shows a top view of a concentric thread with a square starting shape that has a center rotation point of rotation and an offset point of rotation.
Figure 8B:
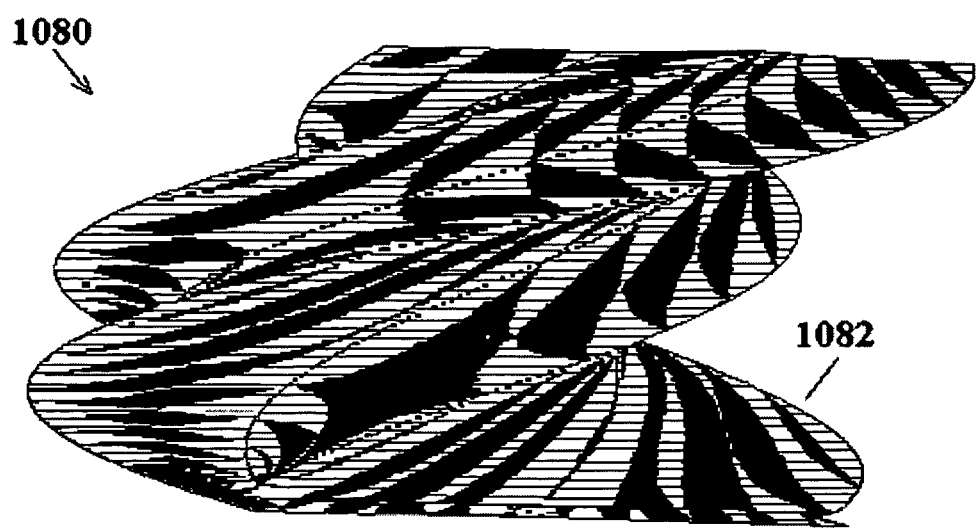
FIG. 8B shows a side view of FIG. 8A.
Figure 8C:
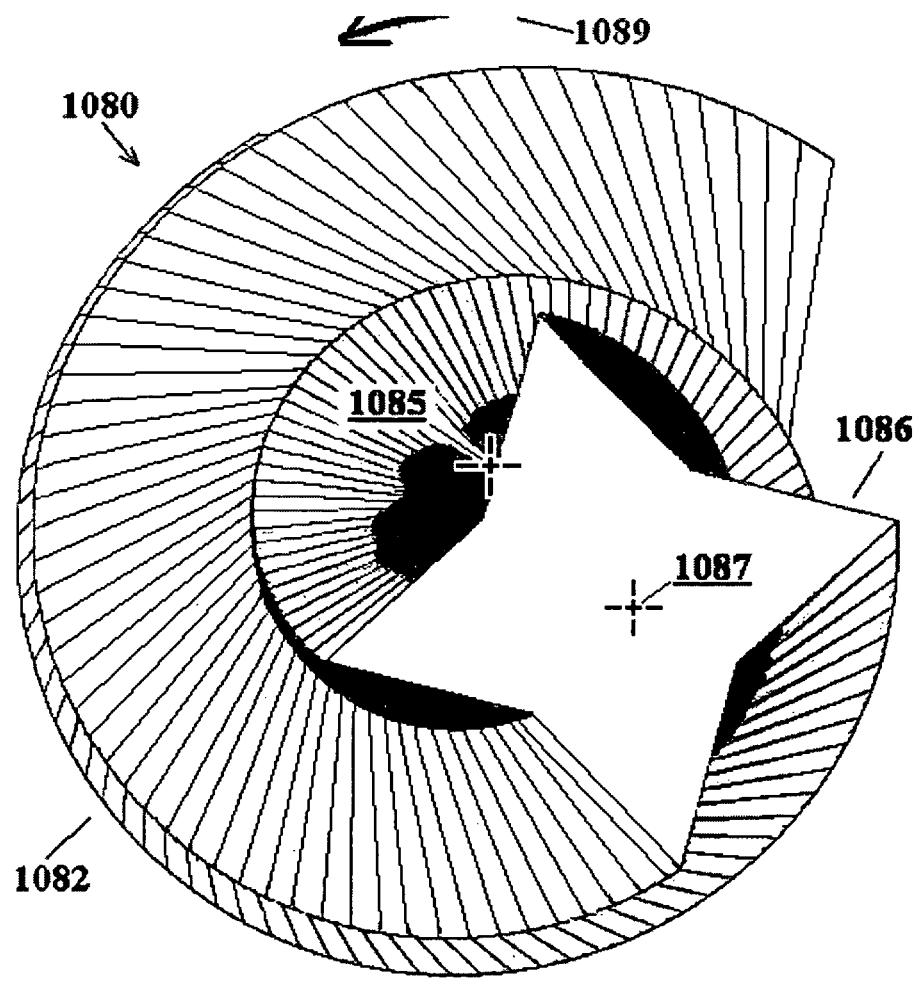
FIG. 8C shows a bottom view of FIG. 8A that has morphed into a four pointed star shape.

The concentric threads can have combinations of rotations. FIGS. 8A-8C show a concentric threaded part 1080, which demonstrates a horizontal offset rotation 1088, 1089 combined with the center rotation. FIG. 8A is an external concentric thread part 1080 that starts with a square shape 1083 that has a center point 1084. The horizontal offset has a center 1085 and rotates clockwise 1088. FIG. 8B is a side view showing the threads 1082. FIG. 8C shows the square shape 1083 has morphed into a four pointed start 1086 with a center 1087. With each successive layer, shapes can gradually change from one shape to another. What matters is local clearance. If the plug has clearance, then the thread will as well. From the bottom, the offset rotation 1089 looks counterclockwise about the center 1085.

Figure 9A:
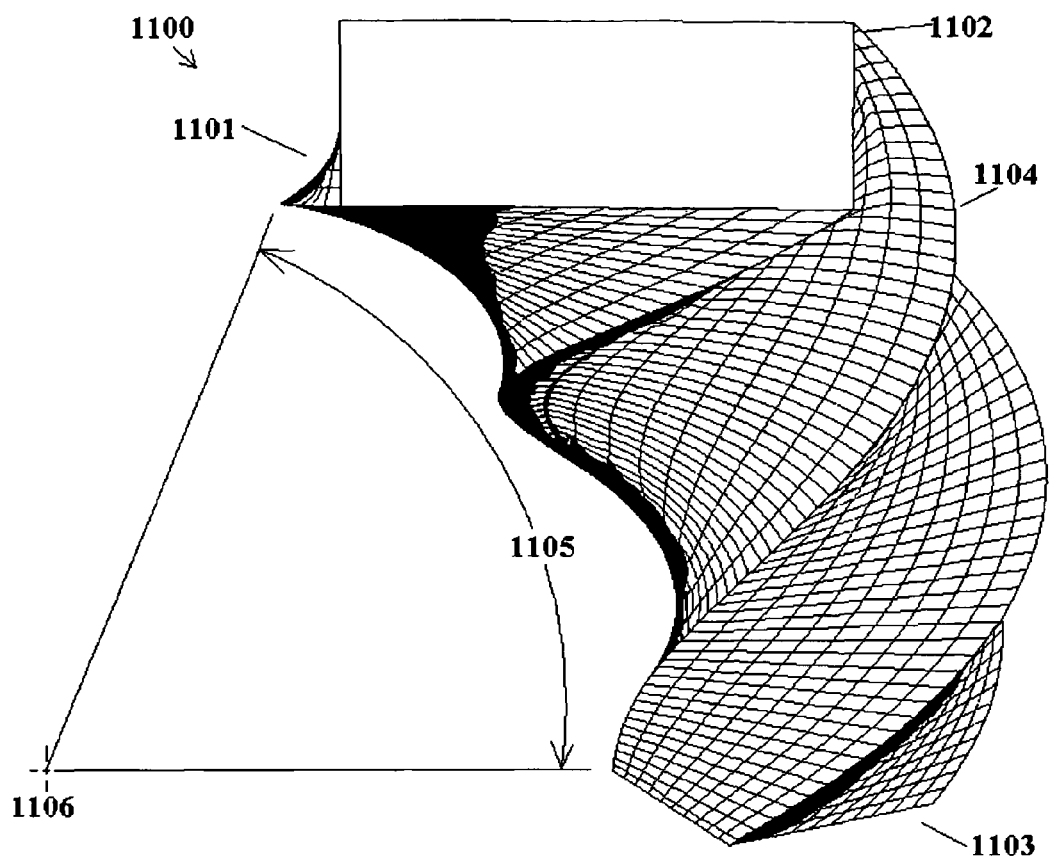
FIG. 9A shows a side isometric view of a wireframe of a concentric thread with a vertical offset giving it a vertical curve.

A concentric threaded part 1100 having a vertical offset is shown in FIG. 9A. The part 1100 has an external concentric thread 1101 with a rectangular top 1102 and square bottom 1103 that rotates to form the threads 1104. The vertical offset has a center 1106 for the arc 1105 that demonstrates the vertical curve that 1101 takes.

Figure 9B:
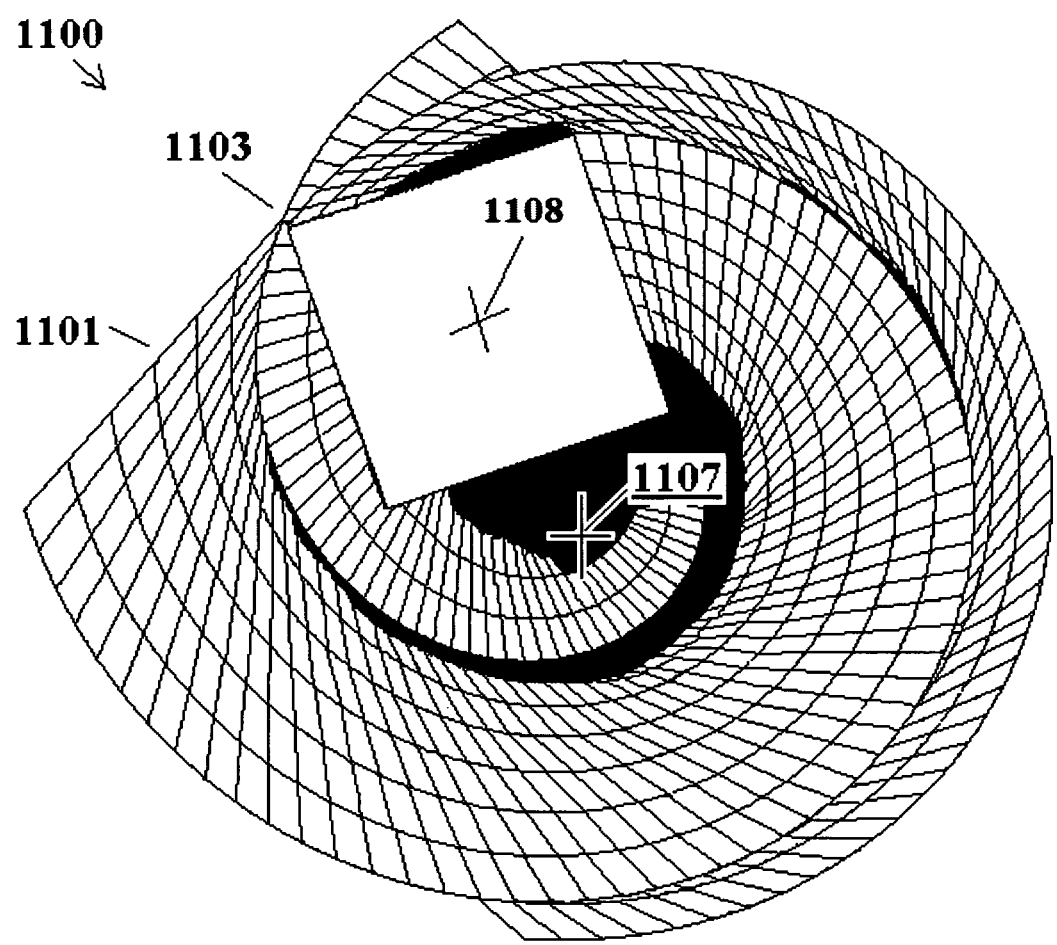
FIG. 9B shows a top view FIG. 9A with a center axis and an offset horizontal axis.

FIG. 9B is a bottom view 1100 of the concentric thread 1101 showing the bottom square shape 1103 with its center of rotation 1108 and a horizontal offset center of rotation 1107. FIGS. 9A-9B is a combination of a thread rotation on its axis, with a horizontal offset rotation and a vertical rotation.

Figure 10A:
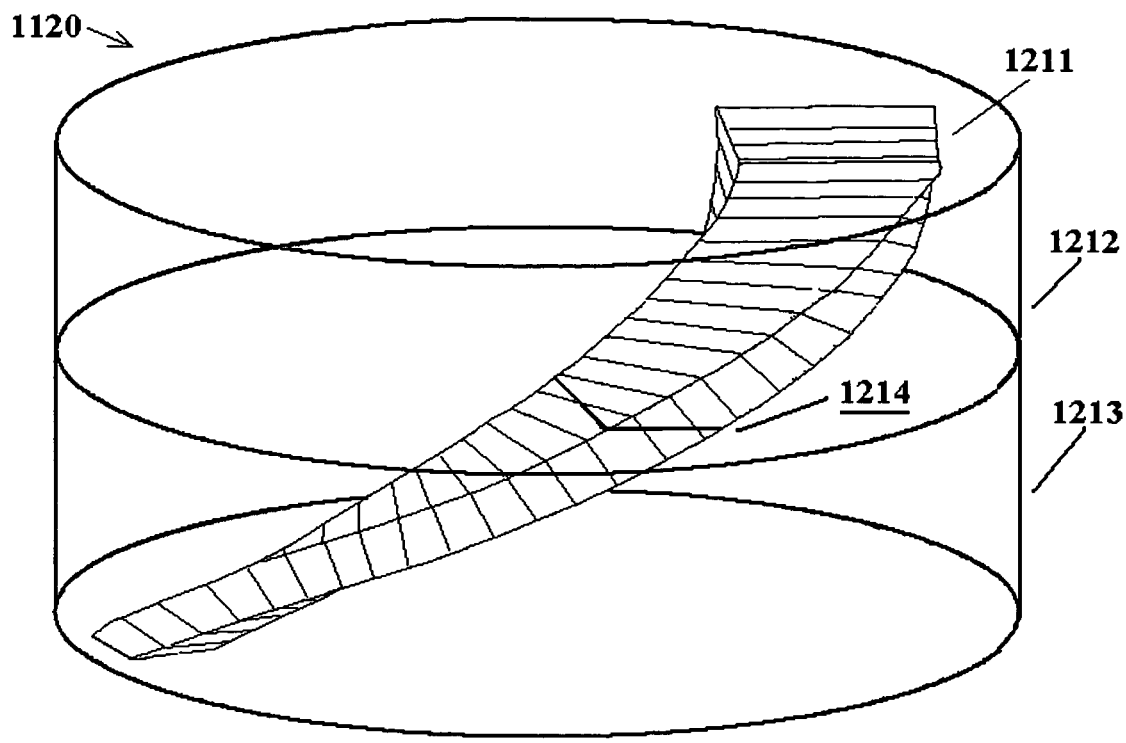
FIG. 10A shows a diagrammatic side view of an external concentric spike through two plates.
Figure 10B:
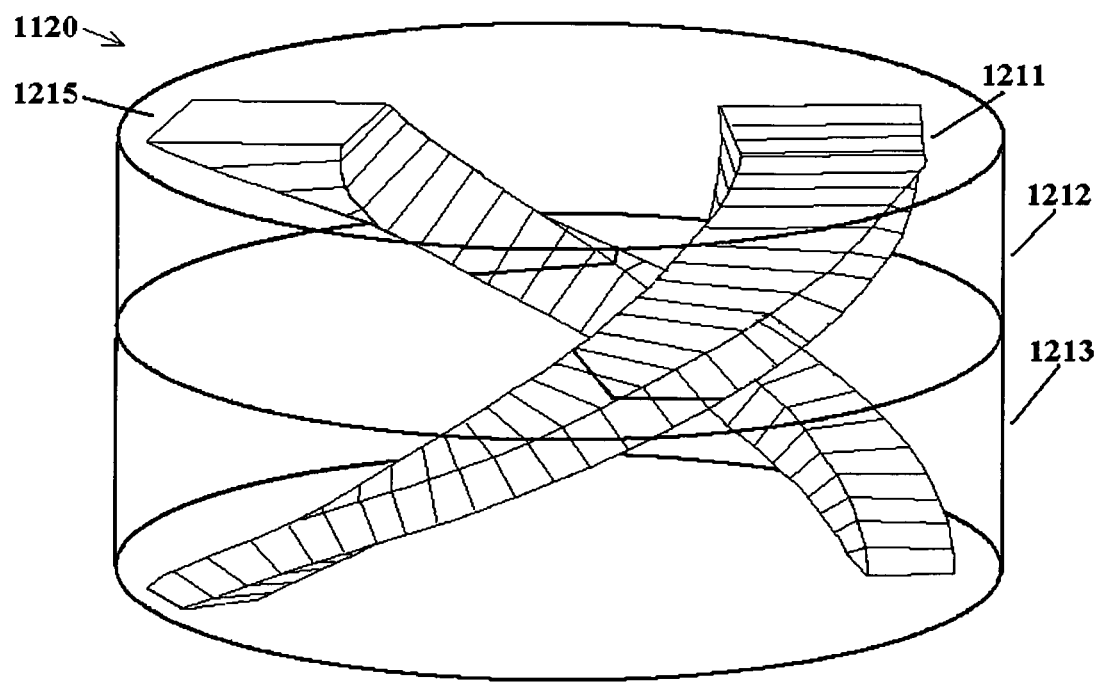
FIG. 10B shows a diagrammatic side view of two external concentric spikes through two plates.

FIG. 10A shows a concentric thread that looks like a spike 1211 between two plates 1212, 1213. If there is any rotation on the either plate, that could deform the shape of the spike at the boundary 1214. FIG. 10B is two concentric threaded 1211, 1215 spikes that keep the plates 1212, 1213 from rotating. This is called a Lawson Lock 1120 where two or more concentric threaded devices act together for fastening multiple parts.

Figure 11A:
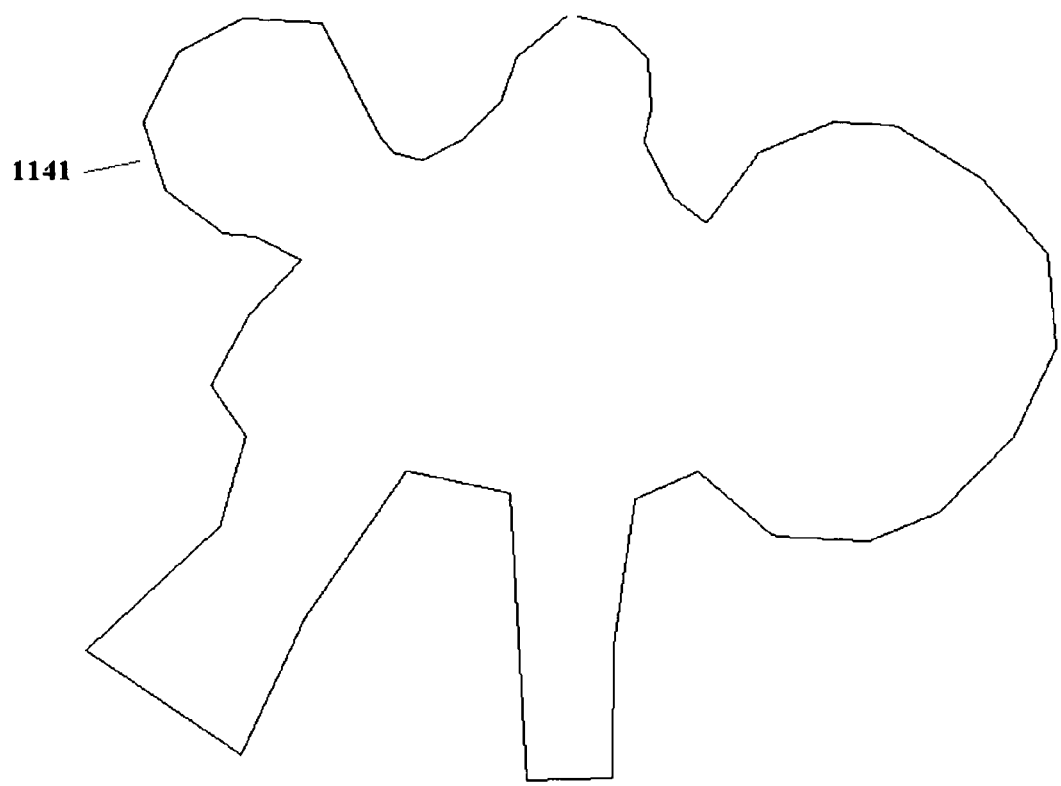
FIG. 11A shows a nonsense shape.
Figure 11B:
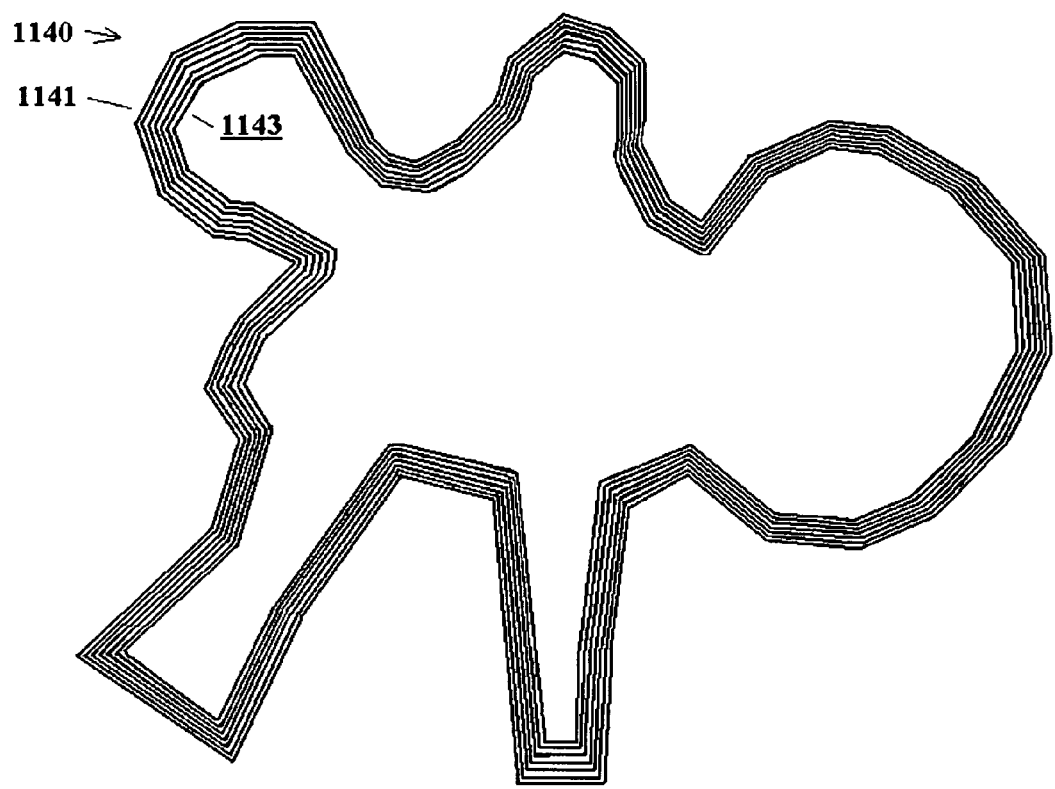
FIG. 11B shows the nonsense shape of FIG. 11A with contracting internal concentric shapes.
Figure 11C:
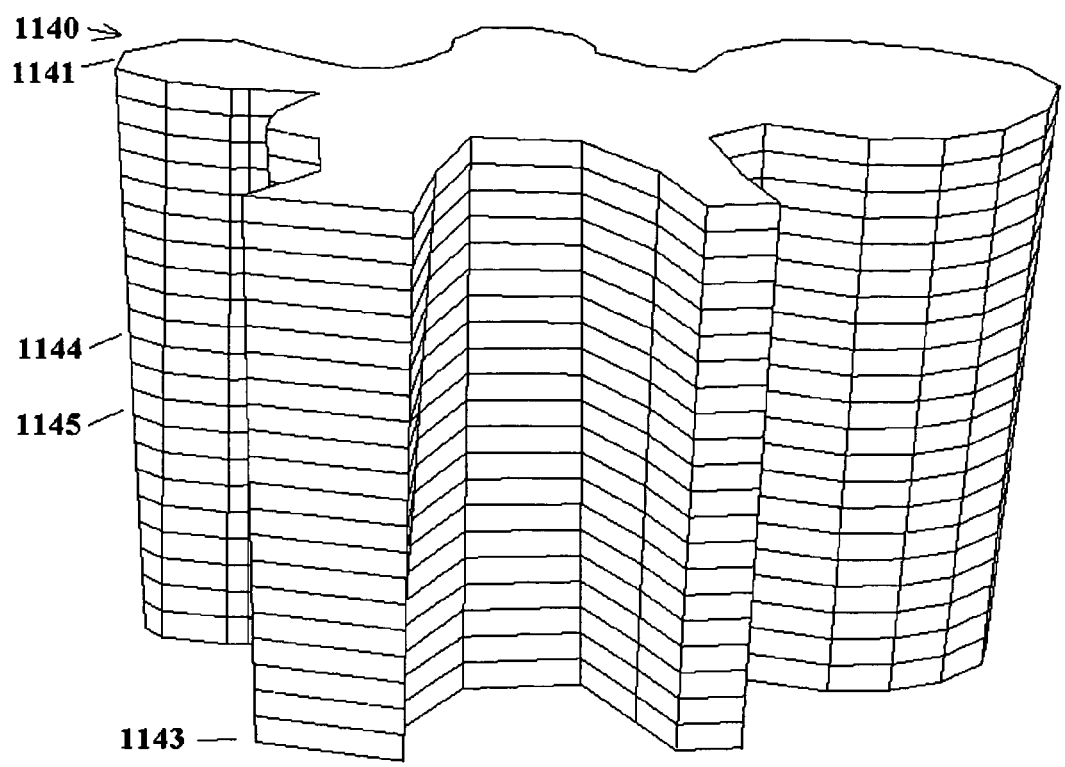
FIG. 11C shows the nonsense shape of FIG. 11B expanded into a plug with the internal shapes representing layers in a continuous surface.
Figure 11D:
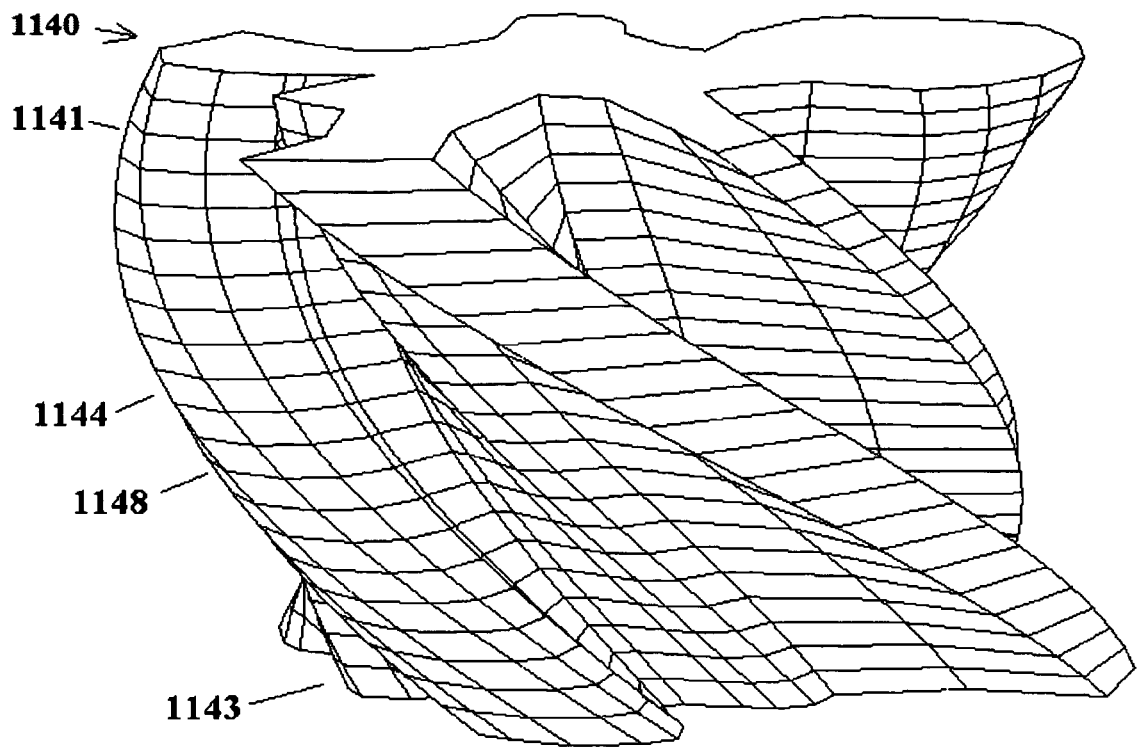
FIG. 11D shows FIG. 11C with each layer rotated accumulatively forming a concentric shape.
Figure 11E:
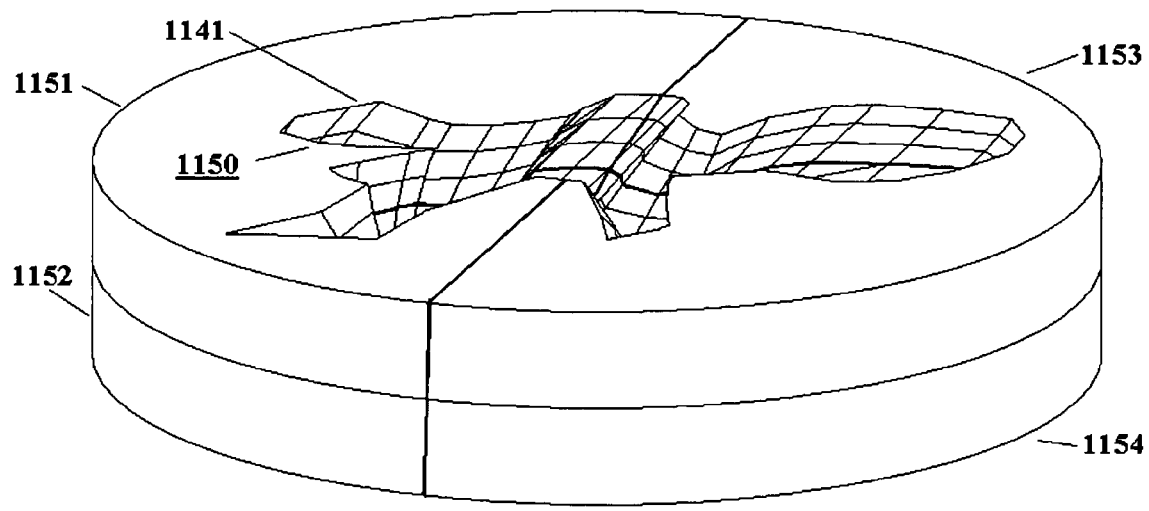
FIG. 11E shows the internal receiving shape for FIG. 11D.
Figure 11F:
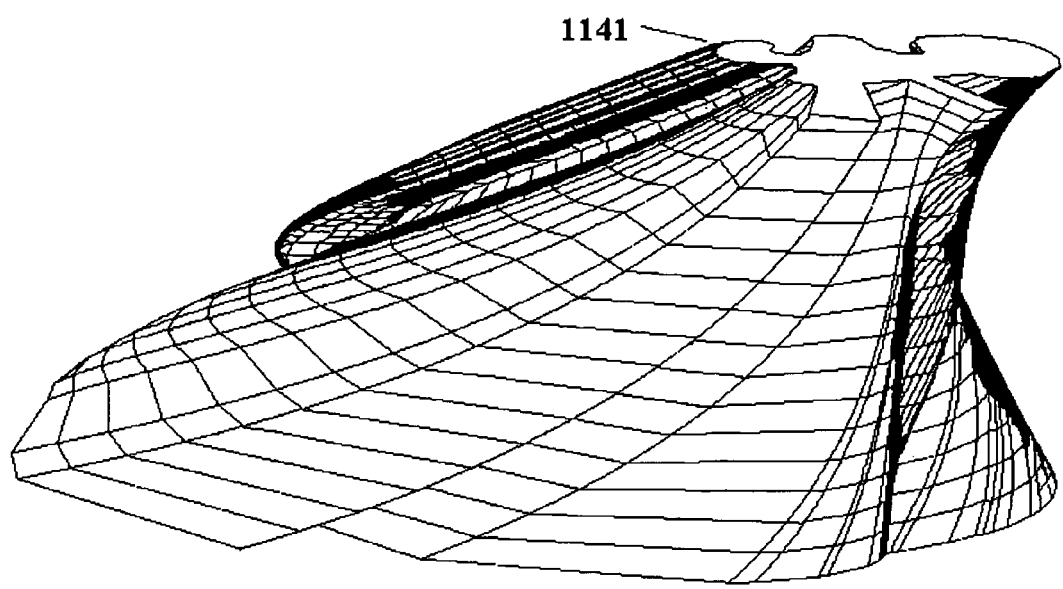
FIG. 11F shows the shape of FIG. 11A with an external shape that is accelerating values.

Now referring to FIGS. 11A-11F, the concentric thread concept can take forms that are not thread-like and turn them into threads. The nonsense shape 1141 in FIG. 11A is a collection of lines that form a shape. In FIG. 11B this nonsense shape 1141 forms a plug 1140 with concentric shapes and an ending shape 1143. These concentric shapes are projected into a three-dimensional plug 1140 in FIG. 11C with sides 1144 that are vertical 1145. In FIG. 11D the plug 1140 was given a rotation to form a concentric thread 1148. FIG. 11E shows a multiple part internal shape 1150. Concentric thread 1148 will lock parts 1151, 1152, 1153 and 1154 together. This is a Persson Lock configuration. It is a demonstration of how very divergent shapes can be made into a fastener. In practice, such a shape may require one bolt to keep it from unscrewing, but a large portion of the outside surface can dynamically fasten these parts together. FIG. 11F shows the same shape 1141 with a different expansion ratio in forming its thread. It will engage in 5-10 degrees of rotation and it will need a bolt to hold it in place.

FIGS. 11A-11F demonstrate that a concentric thread can be incorporated into very odd part shapes to become dynamically fastened. It is inherent that a portion of the thread can be used to fasten. Manufacturing assemblies can reduce the number of fasteners needed by incorporating there shapes into concentric threads.

Figure 12A:
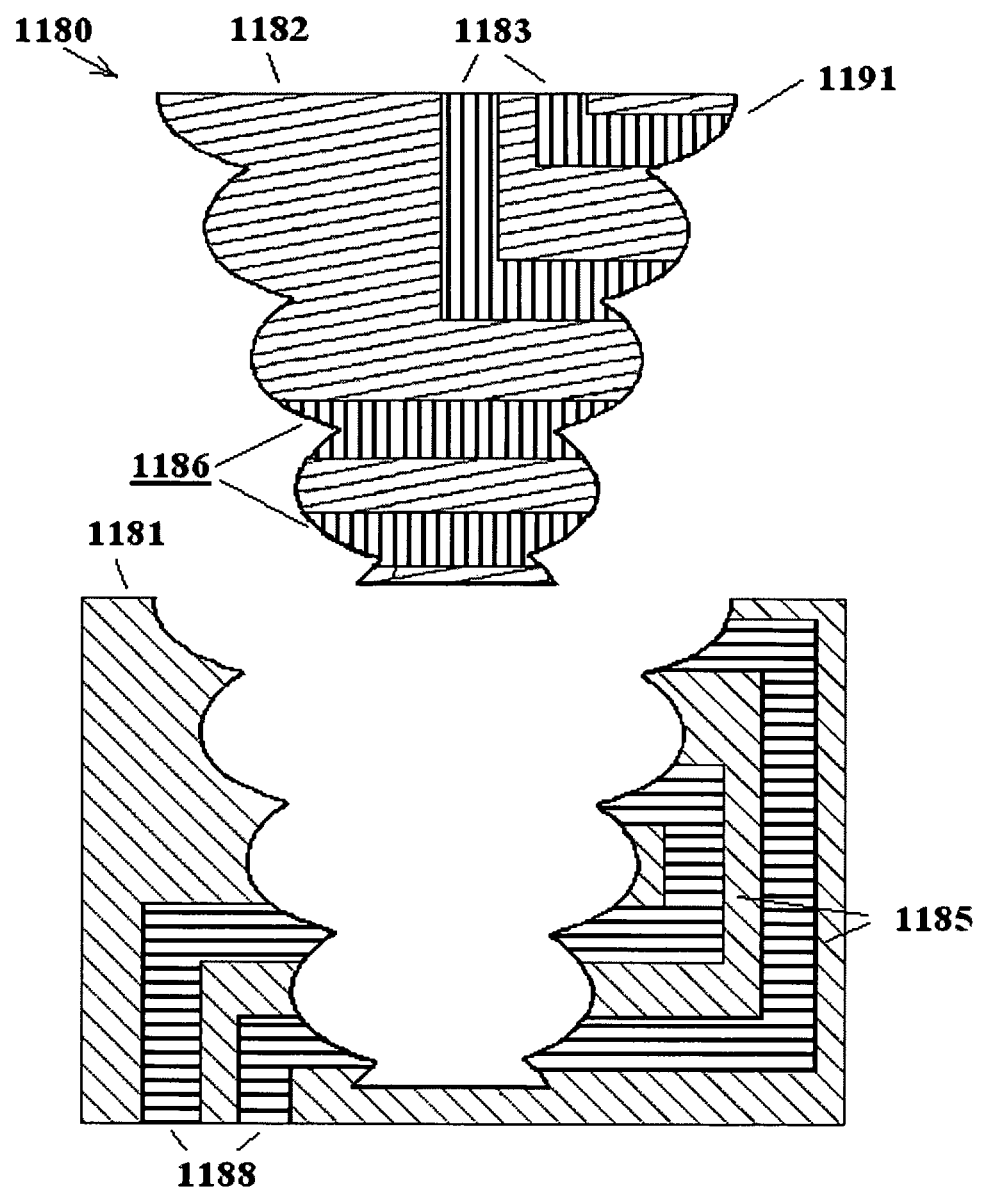
FIG. 12A shows a male conduit component position above a female conduit component.

Another aspect of the conic, wave and concentric thread is that its surfaces are position specific. Their fastening capacity can also align conduits 1180 as demonstrated in FIGS. 12A-12C. FIG. 12A is the male component 1182 in position 1191 above the female component 1181. Male component 1182 has conduit inputs 1183 and bridge 1186. The female component 1181 has outputs 1188 and transits 1185.

Figure 12B:
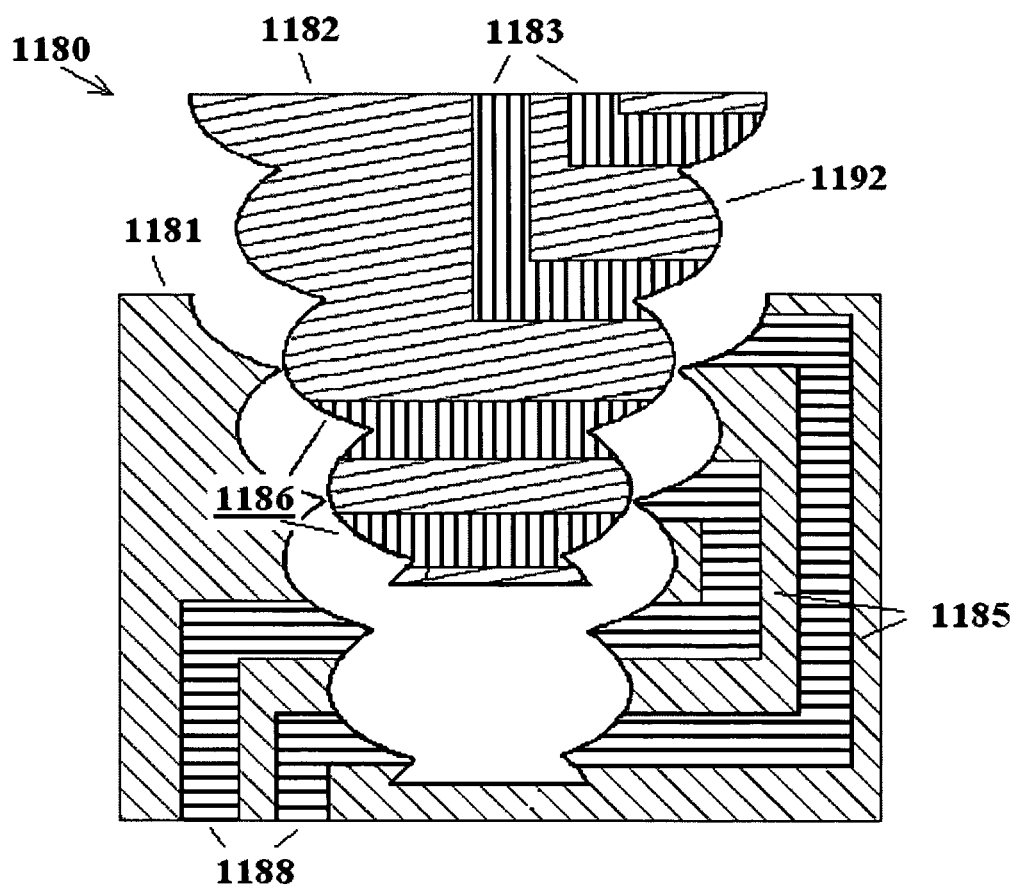
FIG. 12B shows the male conduit component at an initial engagement position of fastening to the female conduit component.
Figure 12C:
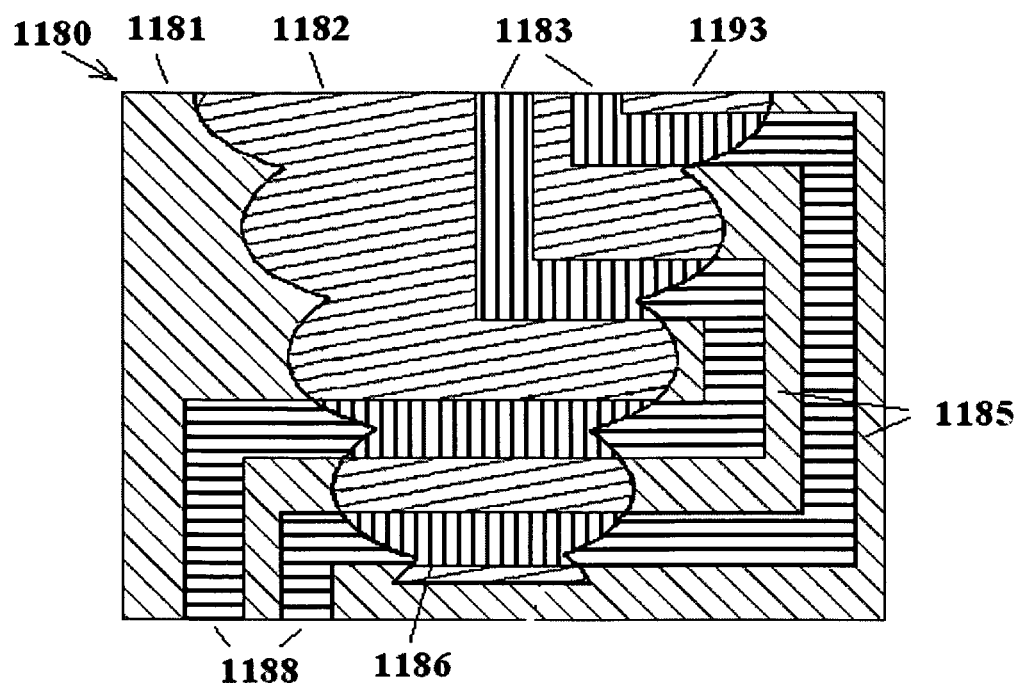
FIG. 12C shows the full fastening engagement of the male and female components aligning their conduits.

FIG. 12B shows the male component 1182 at position 1192 with first contact of the threads. FIG. 12C shows the male and female fully engaged at position 1193. Now the conduit input 1183 is connected to the transit 1188; the transit 1188 is connected to the bridge 1186; and the bridge 1186 is connected to the output 1183. If this is an electrical circuit it will not be live until all the surfaces engage.

The present invention may be used with high voltage applications that use a knife switch. Such applications have been in use for at least 100 years. The present invention will reduce arcing because all surfaces have to be aligned to conduit electricity. The conduits may be fluids, gas, inferred, photonic, electrical, or optical. The components also form a key. Different components may be used for different routing of the connections. They are not aligned until all the fasteners surfaces are engaged.

Although the present invention has been described in considerable detail with reference to certain preferred versions thereof, other versions would be readily apparent to those of ordinary skill in the art. Therefore, the spirit and scope of the invention should not be limited to the description of the preferred versions contained herein.

What is claimed is:

1. A concentric threaded fastener comprising:
   a body comprising a starting shape at one end, an ending shape at another end wherein said starting shape is not a circle and at least one continuous surface formed by a plurality of concentric layers disposed between said starting shape and said ending shape;
   wherein each of said plurality of layers has a thickness defined by slices taken perpendicular to a central longitudinal axis such that a shape of each successive slice from said starting shape to said ending shape is dimensioned to have a local clearance such that said shape of said slice fits within a shape of an adjacent larger slice and such that said plurality of layers forms a plug when each of said plurality of layers is aligned in an unrotated position; and wherein each of said plurality of slices of said plurality of layers is successively rotated about a central axis to form said at least one substantially continuous surface.

2. The concentric threaded fastener as claimed in claim 1 wherein said plurality defining slices of said plurality of layers is rotated about a single axis.

3. The concentric threaded fastener as claimed in claim 1 wherein said plurality of layers is rotated about at least two axes.

4. The concentric threaded fastener as claimed in claim 1 wherein said starting shape and said ending shape are substantially the same shape and wherein said ending shape is a fraction of a size of said starting shape.

5. The concentric threaded fastener as claimed in claim 1 wherein said starting shape and said ending shape are substantially different shapes.

6. The concentric threaded fastener as claimed in claim 1 wherein each of said plurality of layers has a substantially equal thickness and wherein a line drawn tangent to each of said plurality of layers of said at least one substantially continuous surface has a substantially straight when each of said plurality of layers is aligned in an unrotated position.

7. The concentric threaded fastener as claimed in claim 1 wherein each of said plurality of layers has a different thickness.

8. The concentric threaded fastener as claimed in claim 7 wherein each of said plurality of layers decreases in thickness from said starting shape to said ending shape at an accelerating rate such that said at least one continuous surface has a substantially concave shape.

9. The concentric threaded fastener as claimed in claim 7 wherein each of said plurality of layers decreases in thickness from said starting shape to said ending shape at a decelerating rate such that said at least one continuous surface has a substantially convex shape.

10. The concentric threaded fastener as claimed in claim 1:
wherein said starting shape comprises a starting size and said ending shape comprises an ending size;
wherein said starting size is smaller than said ending size; and
wherein an accelerating rate of change of size between said starting size and said ending size results in said at least one continuous surface having a substantially convex shape.

11. The concentric threaded fastener as claimed in claim 1:
wherein said starting shape comprises a starting size and said ending shape comprises an ending size;
wherein said starting size is smaller than said ending size; and
wherein a decelerating rate of change of size between said starting size and said ending size results in said at least one continuous surface having a substantially concave shape.

12. The concentric threaded fastener as claimed in claim 1:
wherein said starting shape comprises a starting size and said ending shape comprises an ending size;
wherein said starting size is smaller than said ending size; and
wherein constant rate of change of size between said starting size and said ending size results in line drawn tangent to each of said of plurality of said at least one substantially continuous surface having a substantially straight.

13. The concentric threaded fastener as claimed in claim 1 wherein said starting shape is a barbell shape comprising a narrowed central portion from which a pair of bulbous ends extend.

14. A concentric thread system comprising:
at least one concentric threaded fastener comprising:
a body comprising a starting shape at one end, an ending shape and at another end wherein said starting shape is not a circle, and at least one continuous surface formed by a plurality of concentric layers disposed between said starting shape and said ending shape;
wherein each of said plurality of layers has a thickness defined by slices taken perpendicular to a central longitudinal axis such that a shape of each successive slice from said starting shape to said ending shape is dimensioned to have a local clearance such that said shape of said slice fits within a shape of an adjacent larger slice and such that said plurality of layers forms a plug when each of said plurality of layers is aligned in an unrotated position; and
wherein each of said plurality of slices of said plurality of layers is successively rotated about at least one axis to form said at least one substantially continuous surface; and
at least one receiving component comprising an opening having at least one substantially continuous mating surface dimensioned to accept said at least one continuous surface of said at least one concentric threaded fastener such that said at least one substantially continuous mating surface and said at least one substantially continuous surface of said at least one concentric threaded fastener make substantially complete surface contact when said at least one concentric threaded fastener is at a terminal position within said receiving component.

15. The concentric thread system as claimed in claim 14:
wherein said starting shape of said at least one concentric threaded fastener is a barbell shape comprising a narrowed central portion from which a pair of bulbous ends extend;
wherein said at least one receiving component comprises a first portion and a second portion and wherein each of said first portion and said second portion comprises a portion of said opening into which said at least one concentric threaded fastener is disposed; and
wherein said at least one concentric threaded fastener and said at least one receiving component are each dimensioned such that said at least one concentric threaded fastener secures said first portion and said second portion of said at least one receiving component together both vertically and horizontally when said at least one concentric threaded fastener is at said terminal position.

16. The concentric thread system as claimed in claim 14:
wherein said at least one receiving component comprises at least two receiving components stacked upon each other such that said openings through each of said at least two receiving components align with one another;
wherein said at least one concentric threaded fastener comprises a single concentric threaded fastener having a substantially curved shape and a length sufficient to extend through each of said at least two receiving components; and
wherein said concentric threaded fastener is disposed through said openings through said at least two receiving components to secure said at least two receiving components together.

17. The concentric thread system as claimed in claim 14:
wherein said at least one receiving component comprises at least two receiving components;
wherein each of said at least two receiving components comprises two openings disposed therethrough;

wherein each of a said at least two receiving components is stacked upon each other such that said openings through each of said at least two receiving components align with one another;

wherein said at least one concentric threaded fastener comprises at least two concentric threaded fasteners having a substantially curved shape and a length sufficient to extend through each of said at least two receiving components; and wherein each of said at least two concentric threaded fasteners is disposed through one of said openings through each of said at least two receiving components to secure said at least two receiving components together.

18. The concentric thread system as claimed in claim 14 wherein each of said at least one concentric threaded fastener and said at least one receiving component comprise at least one conduit therethrough and wherein said at least one conduit through said at least one concentric threaded fastener aligns with said conduit through said at least one receiving component when said at least one concentric threaded fastener is at said terminal position.

19. The concentric thread system as claimed in claim 14 wherein each of said at least one concentric threaded fastener and said at least one receiving component comprise at least one electrical contact therethrough and wherein said at least one electrical contact through said at least one concentric threaded fastener aligns with and connects to said electrical contact through said at least one receiving component when said at least one concentric threaded fastener is at said terminal position.

* * * * *